US008323097B2

(12) United States Patent
Klein

(10) Patent No.: US 8,323,097 B2
(45) Date of Patent: Dec. 4, 2012

(54) NON-TRANSITIVE GAMING ELEMENTS AND GAMING METHODS

(76) Inventor: Stanley Klein, Irvine, CA (US)

( * ) Notice: Subject to any disclaimer, the term of this patent is extended or adjusted under 35 U.S.C. 154(b) by 0 days.

(21) Appl. No.: 13/250,868

(22) Filed: Sep. 30, 2011

(65) Prior Publication Data

US 2012/0049447 A1 Mar. 1, 2012

Related U.S. Application Data

(63) Continuation of application No. 10/917,717, filed on Aug. 13, 2004, now Pat. No. 8,029,356.

(60) Provisional application No. 61/443,112, filed on Feb. 15, 2011, provisional application No. 61/447,810, filed on Mar. 1, 2011.

(51) Int. Cl.
*A63F 13/00* (2006.01)

(52) U.S. Cl. .................. 463/22; 463/9; 463/10; 463/11; 463/12; 463/13; 463/16; 463/17; 463/18; 463/19; 463/20; 273/146; 273/274; 273/309

(58) Field of Classification Search ................ 463/9–13, 463/16–22, 25–35; 273/146, 274, 309
See application file for complete search history.

(56) References Cited

U.S. PATENT DOCUMENTS

| | | | | |
|---|---|---|---|---|
| 2,138,305 | A | | 11/1938 | Null |
| 2,293,331 | A | | 8/1942 | Dahlberg |
| 4,948,125 | A | | 8/1990 | Mayes |
| 5,090,706 | A | | 2/1992 | Hokanson |
| 5,133,559 | A | | 7/1992 | Page |
| 5,169,148 | A | | 12/1992 | Wheeler |
| 5,551,697 | A | | 9/1996 | Willenbring |
| 5,641,165 | A | * | 6/1997 | Page ............................ 273/246 |
| 5,695,193 | A | * | 12/1997 | Cheung ......................... 273/274 |
| 5,839,960 | A | | 11/1998 | Parra et al. |
| 6,164,651 | A | | 12/2000 | Webb |
| 6,241,250 | B1 | | 6/2001 | Webb |
| 6,428,005 | B2 | | 8/2002 | Au-Yeung |
| 6,488,284 | B2 | | 12/2002 | Webb |
| 6,550,771 | B1 | | 4/2003 | Weaver et al. |
| 6,656,047 | B1 | | 12/2003 | Tarantino et al. |

(Continued)

FOREIGN PATENT DOCUMENTS

GB 2 138 305 A 10/1984

(Continued)

OTHER PUBLICATIONS

Description of Applicant's pre-filing activities set forth in IDS letter filed Aug. 20, 2008.

(Continued)

*Primary Examiner* — Sunit Pandya
(74) *Attorney, Agent, or Firm* — Howard & Howard Attorneys PLLC

(57) ABSTRACT

Non-transitive gaming elements, including a first, a second and a third one or more gaming elements, respectively, wherein the second provides an advantage represented by higher scores, on average, as compared with the scores of the first, the third provides an advantage represented by higher scores, on average, as compared with the scores of the second and the first provides an advantage represented by higher scores, on average, as compared with the scores of the third, and wherein each of the three respective advantages are all less than 3 percent and each advantage does not differ from the mean of the three advantages by more than 20 percent.

27 Claims, 21 Drawing Sheets

U.S. PATENT DOCUMENTS

| | | | |
|---|---|---|---|
| 6,776,413 | B2 | 8/2004 | Brown, III |
| 6,808,172 | B2 | 10/2004 | Bedford et al. |
| 2001/0022430 | A1 | 9/2001 | Promutico |
| 2003/0075864 | A1 | 4/2003 | Swavy et al. |
| 2003/0085520 | A1 | 5/2003 | Bedford et al. |
| 2004/0130094 | A1 | 7/2004 | Hunter |
| 2004/0140613 | A1 | 7/2004 | Brown, III et al. |
| 2004/0143614 | A1 | 7/2004 | Rarick |

FOREIGN PATENT DOCUMENTS

| | | | |
|---|---|---|---|
| GB | 2 293 331 | A | 3/1996 |

OTHER PUBLICATIONS

International Search Report, date of mailing Mar. 5, 2007.

* cited by examiner

300

| | | | | | |
|---|---|---|---|---|---|
| RED (A1) | 2 2 3 4 5 6 | BLUE (B1) | 1 2 5 5 5 6 | AMBER (C1) | 1 1 1 4 6 6 |
| RED (A2) | 2 2 2 2 5 6 | BLUE (B3) | 1 1 3 3 4 4 | AMBER (C2) | 2 2 3 4 5 6 |

THREE PAIR OF NON-TRANSITIVE DICE -- INDICIA FOR EACH CUBE

FIG. 2

310

| | | | | | |
|---|---|---|---|---|---|
| B TIES A | 10.64815% | C TIES B | 10.64815% | A TIES C | 10.26235% |
| B BEATS A | 45.21605% | C BEATS B | 45.37037% | A BEATS C | 45.44753% |
| A BEATS B | 44.13580% | B BEATS C | 43.98148% | C BEATS A | 44.29012% |

SINGLE-ROLL PROBABILITIES FOR THE THREE PAIR OF NON-TRANSITIVE DICE

FIG. 2A

312

HOUSE ADVANTAGE FOR WAGERS IN A 3-ROLL GAME
(IN PERCENT)

| | THE TWO PAIRS IN PLAY | | | |
|---|---|---|---|---|
| GAME WAGERS | A,B | B,C | C,A | AVERAGE OF 3 COMBINATIONS |
| 1 TO 1 PLAYER | 1.602 | 2.060 | 1.718 | 1.793 |
| 1 TO 1 BANKER | 1.586 | 1.128 | 1.381 | 1.365 |
| AVERAGE 1 TO 1 PAYOFF | 1.594 | 1.594 | 1.550 | 1.579 |
| 5 TO 1 PAYOFF | 4.540 | 4.547 | 7.975 | 5.687 |
| 10 TO 1 PAYOFF | 5.427 | 6.416 | 4.432 | 5.425 |
| 30 TO 1 PAYOFF | 2.039 | 2.039 | 8.757 | 4.278 |
| 750 TO 1 PAYOFF | 9.330 | 9.330 | 18.883 | 12.514 |

FIG. 2B

315

NON-TRANSITIVE CASINO GAME - 3 CARD DECKS & HOUSE ADVANTAGES

| CARD VALUES: | 1 | 2 | 3 | 4 | 5 | 6 | 7 | 8 | 9 | 10 | 11 |
|---|---|---|---|---|---|---|---|---|---|---|---|
| DECK A COMPOSITION: | 0 | 4 | 13 | 7 | 6 | 19 | 13 | 1 | 4 | 6 | 2 |
| DECK B COMPOSITION: | 4 | 4 | 5 | 7 | 13 | 12 | 10 | 17 | 3 | 0 | 0 |
| DECK C COMPOSITION: | 2 | 9 | 7 | 7 | 11 | 8 | 10 | 6 | 10 | 4 | 1 |

75 CARDS IN EACH DECK

SINGLE CARD DEAL PROBABILITIES:

DECKS IN PLAY: (B,A)

| B>A | A>B | B=A |
|---|---|---|
| 0.4522667 | 0.4419555 | 0.1057778 |

DECKS IN PLAY: (C,B)

| C>B | B>C | C=B |
|---|---|---|
| 0.4519112 | 0.4416000 | 0.1064889 |

DECKS IN PLAY: (A,C)

| A>C | C>A | A=C |
|---|---|---|
| 0.4524445 | 0.4416000 | 0.1059556 |

320

TABLE GAME WAGERS AND THEIR ASSOCIATED HOUSE ADVANTAGES (IN PERCENT)

| | DECKS IN PLAY | | | AVERAGE OF ALL |
|---|---|---|---|---|
| | A,B | B,C | C,A | 3 COMBINATIONS |
| 1 TO 1 PLAYER | 1.529 | 1.529 | 1.608 | 1.555 |
| 1 TO 1 BANKER | 1.642 | 1.659 | 1.567 | 1.623 |
| AVERAGE 1 TO 1 PAYOFF | 1.586 | 1.594 | 1.588 | 1.589 |
| PUSH - 5 TO 1 PAYOFF | 5.165 | 4.532 | 5.008 | 4.902 |
| TRIPLE PPP - 10 TO 1 PAYOFF | 5.043 | 5.272 | 5.272 | 5.196 |
| TWO OR THREE TIES - 30 TO 1 PAYOFF | 3.281 | 2.026 | 2.968 | 2.758 |
| THREE TIES - 750 TO 1 PAYOFF | 11.116 | 9.311 | 10.667 | 10.365 |

*FIG. 2C*

Table 720 - Gaming Elements 710

All Single Roll Probabilities for Red Pair 712 (a,b) vs. Blue Pair 714 (a,b)

| Blue Pair 714 Pips: | | | | | | | |
|---|---|---|---|---|---|---|---|
| 714b Pips: | 1 | 2 | 5 | 5 | 5 | 6 | In the Table Below, -1 Means that Blue Loses to Red |
| | | | | | | | In the Table Below, +1 Means that Red Loses to Blue |
| 714a Pips: | 1 | 1 | 3 | 3 | 4 | 4 | In the Table Below, 0 Means that Pairs Red & Blue Tie |

Red Pair 712 Pips

| 712b | 712a | 36 Red Possibilities | All 36 Blue Possibilities / Red Totals | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|---|---|
| | | | All Blue Totals: | 2 | 3 | 6 | 6 | 6 | 7 | 2 | 3 | 6 | 6 | 6 | 7 | 4 | 5 | 8 | 8 | 8 | 9 | 4 | 5 | 8 | 8 | 8 | 9 | 5 | 6 | 9 | 9 | 9 | 10 | 5 | 6 | 9 | 9 | 9 | 10 |
| 2 | 2 | 1 | 4 | -1 | -1 | 1 | 1 | 1 | 1 | -1 | -1 | 1 | 1 | 1 | 1 | 0 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 |
| 2 | 2 | 2 | 4 | -1 | -1 | 1 | 1 | 1 | 1 | -1 | -1 | 1 | 1 | 1 | 1 | 0 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 |
| 3 | 2 | 3 | 4 | -1 | -1 | 1 | 1 | 1 | 1 | -1 | -1 | 1 | 1 | 1 | 1 | 0 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 |
| 4 | 2 | 4 | 4 | -1 | -1 | 1 | 1 | 1 | 1 | -1 | -1 | 1 | 1 | 1 | 1 | 0 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 |
| 5 | 5 | 5 | 7 | -1 | -1 | -1 | -1 | -1 | 0 | -1 | -1 | -1 | -1 | -1 | 0 | -1 | -1 | 1 | 1 | 1 | 1 | -1 | -1 | 1 | 1 | 1 | 1 | -1 | -1 | 1 | 1 | 1 | 1 | -1 | -1 | 1 | 1 | 1 | 1 |
| 6 | 6 | 6 | 8 | -1 | -1 | -1 | -1 | -1 | -1 | -1 | -1 | -1 | -1 | -1 | -1 | -1 | -1 | 0 | 0 | 0 | 1 | -1 | -1 | 0 | 0 | 0 | 1 | -1 | -1 | 1 | 1 | 1 | 1 | -1 | -1 | 1 | 1 | 1 | 1 |
| | | 7 | 4 | -1 | -1 | 1 | 1 | 1 | 1 | -1 | -1 | 1 | 1 | 1 | 1 | 0 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 |
| | | 8 | 4 | -1 | -1 | 1 | 1 | 1 | 1 | -1 | -1 | 1 | 1 | 1 | 1 | 0 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 |
| | | 9 | 4 | -1 | -1 | 1 | 1 | 1 | 1 | -1 | -1 | 1 | 1 | 1 | 1 | 0 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 |
| | | 10 | 4 | -1 | -1 | 1 | 1 | 1 | 1 | -1 | -1 | 1 | 1 | 1 | 1 | 0 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 |
| | | 11 | 7 | -1 | -1 | -1 | -1 | -1 | 0 | -1 | -1 | -1 | -1 | -1 | 0 | -1 | -1 | 1 | 1 | 1 | 1 | -1 | -1 | 1 | 1 | 1 | 1 | -1 | -1 | 1 | 1 | 1 | 1 | -1 | -1 | 1 | 1 | 1 | 1 |
| | | 12 | 8 | -1 | -1 | -1 | -1 | -1 | -1 | -1 | -1 | -1 | -1 | -1 | -1 | -1 | -1 | 0 | 0 | 0 | 1 | -1 | -1 | 0 | 0 | 0 | 1 | -1 | -1 | 1 | 1 | 1 | 1 | -1 | -1 | 1 | 1 | 1 | 1 |
| | | 13 | 5 | -1 | -1 | 1 | 1 | 1 | 1 | -1 | -1 | 1 | 1 | 1 | 1 | -1 | 0 | 1 | 1 | 1 | 1 | -1 | 0 | 1 | 1 | 1 | 1 | 0 | 1 | 1 | 1 | 1 | 1 | 0 | 1 | 1 | 1 | 1 | 1 |
| | | 14 | 5 | -1 | -1 | 1 | 1 | 1 | 1 | -1 | -1 | 1 | 1 | 1 | 1 | -1 | 0 | 1 | 1 | 1 | 1 | -1 | 0 | 1 | 1 | 1 | 1 | 0 | 1 | 1 | 1 | 1 | 1 | 0 | 1 | 1 | 1 | 1 | 1 |
| | | 15 | 5 | -1 | -1 | 1 | 1 | 1 | 1 | -1 | -1 | 1 | 1 | 1 | 1 | -1 | 0 | 1 | 1 | 1 | 1 | -1 | 0 | 1 | 1 | 1 | 1 | 0 | 1 | 1 | 1 | 1 | 1 | 0 | 1 | 1 | 1 | 1 | 1 |
| | | 16 | 5 | -1 | -1 | 1 | 1 | 1 | 1 | -1 | -1 | 1 | 1 | 1 | 1 | -1 | 0 | 1 | 1 | 1 | 1 | -1 | 0 | 1 | 1 | 1 | 1 | 0 | 1 | 1 | 1 | 1 | 1 | 0 | 1 | 1 | 1 | 1 | 1 |
| | | 17 | 8 | -1 | -1 | -1 | -1 | -1 | -1 | -1 | -1 | -1 | -1 | -1 | -1 | -1 | -1 | 0 | 0 | 0 | 1 | -1 | -1 | 0 | 0 | 0 | 1 | -1 | -1 | 1 | 1 | 1 | 1 | -1 | -1 | 1 | 1 | 1 | 1 |
| | | 18 | 9 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 0 | -1 | -1 | 0 | 0 | 0 | 1 | -1 | -1 | 0 | 0 | 0 | 1 |
| | | 19 | 6 | -1 | -1 | 0 | 0 | 0 | 1 | -1 | -1 | 0 | 0 | 0 | 1 | -1 | -1 | 1 | 1 | 1 | 1 | -1 | -1 | 1 | 1 | 1 | 1 | -1 | 0 | 1 | 1 | 1 | 1 | -1 | 0 | 1 | 1 | 1 | 1 |
| | | 20 | 6 | -1 | -1 | 0 | 0 | 0 | 1 | -1 | -1 | 0 | 0 | 0 | 1 | -1 | -1 | 1 | 1 | 1 | 1 | -1 | -1 | 1 | 1 | 1 | 1 | -1 | 0 | 1 | 1 | 1 | 1 | -1 | 0 | 1 | 1 | 1 | 1 |
| | | 21 | 6 | -1 | -1 | 0 | 0 | 0 | 1 | -1 | -1 | 0 | 0 | 0 | 1 | -1 | -1 | 1 | 1 | 1 | 1 | -1 | -1 | 1 | 1 | 1 | 1 | -1 | 0 | 1 | 1 | 1 | 1 | -1 | 0 | 1 | 1 | 1 | 1 |
| | | 22 | 6 | -1 | -1 | 0 | 0 | 0 | 1 | -1 | -1 | 0 | 0 | 0 | 1 | -1 | -1 | 1 | 1 | 1 | 1 | -1 | -1 | 1 | 1 | 1 | 1 | -1 | 0 | 1 | 1 | 1 | 1 | -1 | 0 | 1 | 1 | 1 | 1 |
| | | 23 | 9 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 0 | -1 | -1 | 0 | 0 | 0 | 1 | -1 | -1 | 0 | 0 | 0 | 1 |
| | | 24 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 0 |
| | | 25 | 7 | -1 | -1 | -1 | -1 | -1 | 0 | -1 | -1 | -1 | -1 | -1 | 0 | -1 | -1 | 1 | 1 | 1 | 1 | -1 | -1 | 1 | 1 | 1 | 1 | -1 | -1 | 1 | 1 | 1 | 1 | -1 | -1 | 1 | 1 | 1 | 1 |
| | | 26 | 7 | -1 | -1 | -1 | -1 | -1 | 0 | -1 | -1 | -1 | -1 | -1 | 0 | -1 | -1 | 1 | 1 | 1 | 1 | -1 | -1 | 1 | 1 | 1 | 1 | -1 | -1 | 1 | 1 | 1 | 1 | -1 | -1 | 1 | 1 | 1 | 1 |
| | | 27 | 7 | -1 | -1 | -1 | -1 | -1 | 0 | -1 | -1 | -1 | -1 | -1 | 0 | -1 | -1 | 1 | 1 | 1 | 1 | -1 | -1 | 1 | 1 | 1 | 1 | -1 | -1 | 1 | 1 | 1 | 1 | -1 | -1 | 1 | 1 | 1 | 1 |
| | | 28 | 7 | -1 | -1 | -1 | -1 | -1 | 0 | -1 | -1 | -1 | -1 | -1 | 0 | -1 | -1 | 1 | 1 | 1 | 1 | -1 | -1 | 1 | 1 | 1 | 1 | -1 | -1 | 1 | 1 | 1 | 1 | -1 | -1 | 1 | 1 | 1 | 1 |
| | | 29 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 0 |
| | | 30 | 11 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |
| | | 31 | 8 | -1 | -1 | -1 | -1 | -1 | -1 | -1 | -1 | -1 | -1 | -1 | -1 | -1 | -1 | 0 | 0 | 0 | 1 | -1 | -1 | 0 | 0 | 0 | 1 | -1 | -1 | 1 | 1 | 1 | 1 | -1 | -1 | 1 | 1 | 1 | 1 |
| | | 32 | 8 | -1 | -1 | -1 | -1 | -1 | -1 | -1 | -1 | -1 | -1 | -1 | -1 | -1 | -1 | 0 | 0 | 0 | 1 | -1 | -1 | 0 | 0 | 0 | 1 | -1 | -1 | 1 | 1 | 1 | 1 | -1 | -1 | 1 | 1 | 1 | 1 |
| | | 33 | 8 | -1 | -1 | -1 | -1 | -1 | -1 | -1 | -1 | -1 | -1 | -1 | -1 | -1 | -1 | 0 | 0 | 0 | 1 | -1 | -1 | 0 | 0 | 0 | 1 | -1 | -1 | 1 | 1 | 1 | 1 | -1 | -1 | 1 | 1 | 1 | 1 |
| | | 34 | 8 | -1 | -1 | -1 | -1 | -1 | -1 | -1 | -1 | -1 | -1 | -1 | -1 | -1 | -1 | 0 | 0 | 0 | 1 | -1 | -1 | 0 | 0 | 0 | 1 | -1 | -1 | 1 | 1 | 1 | 1 | -1 | -1 | 1 | 1 | 1 | 1 |
| | | 35 | 11 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |
| | | 36 | 12 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |

| | Totals of All Outcomes | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|---|
| Total Red Wins ( -1 Totals ): | 572 | = Sum: { | 36 | 36 | 20 | 20 | 20 | 14 | 36 | 36 | 20 | 20 | 20 | 14 | 28 | 24 | 7 | 7 | 7 | 5 | 28 | 24 | 7 | 7 | 7 | 5 | 24 | 20 | 5 | 5 | 5 | 3 | 24 | 20 | 5 | 5 | 5 | 3 } |
| Total Blue Wins ( +1 Totals ): | 586 | = Sum: { | 0 | 0 | 12 | 12 | 12 | 16 | 0 | 0 | 12 | 12 | 12 | 16 | 0 | 8 | 22 | 22 | 22 | 29 | 0 | 8 | 22 | 22 | 22 | 29 | 8 | 12 | 29 | 29 | 29 | 31 | 8 | 12 | 29 | 29 | 29 | 31 } |
| Total Red and Blue Tie ( 0 Totals): | 138 | = Sum: { | 0 | 0 | 4 | 4 | 4 | 6 | 0 | 0 | 4 | 4 | 4 | 6 | 8 | 4 | 7 | 7 | 7 | 2 | 8 | 4 | 7 | 7 | 7 | 2 | 4 | 4 | 2 | 2 | 2 | 2 | 4 | 4 | 2 | 2 | 2 | 2 } |
| ck -- Total of All Outcomes (= 36 x 36): | 1,296 | | | | | | | | | | | | | | | | | | | | | | | | | | | | | | | | | | | | | |

44.1358% = Probability that Red Wins the Roll
45.2160% = Probability that Blue Wins the Roll
10.6481% = Probability that Red and Blue Tie on the Roll 1.0802% = The Edge Blue has over Red

Fig. 9

Table 722 - Gaming Elements 710

All Single Roll Probabilities for Amber Pair 716 vs. Red Pair 712

Red Pair 712 Pips:

| | | | | | | |
|---|---|---|---|---|---|---|
| 712b Pips: | 2 | 2 | 3 | 4 | 5 | 6 |
| 712a Pips: | 2 | 2 | 2 | 2 | 5 | 6 |

In the Table Below, -1 Means that Red Loses to Amber
In the Table Below, +1 Means that Amber Loses to Red
In the Table Below, 0 Means that Amber & Red Tie Amber Pair 716 Pips

| 716b | 716a | 36 Amber Possibilities | All 36 Red Possibilities: | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|---|---|
| | | | All Red Totals: | 4 | 4 | 5 | 6 | 7 | 8 | 4 | 4 | 5 | 6 | 7 | 8 | 4 | 4 | 5 | 6 | 7 | 8 | 4 | 4 | 5 | 6 | 7 | 8 | 7 | 7 | 8 | 9 | 10 | 11 | 8 | 8 | 9 | 10 | 11 | 12 |
| | | | All Amber Totals | | | | | | | | | | | | | | | | | | | | | | | | | | | | | | | | | | | | |
| 1 | 2 | 1 | 3 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 2 | 2 | 3 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 3 | 3 | 4 | 0 | 0 | 1 | 1 | 1 | 1 | 0 | 0 | 1 | 1 | 1 | 1 | 0 | 0 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| 4 | 4 | 4 | 5 | -1 | -1 | 0 | 1 | 1 | 1 | -1 | -1 | 0 | 1 | 1 | 1 | -1 | -1 | 0 | 1 | 1 | 1 | -1 | -1 | 0 | 1 | 1 | 1 | 1 | 1 | 1 | 1 | 1 | 1 | 1 | 1 | 1 | 1 | 1 | 1 |
| 6 | 5 | 5 | 6 | -1 | -1 | -1 | 0 | 1 | 1 | -1 | -1 | -1 | 0 | 1 | 1 | -1 | -1 | -1 | 0 | 1 | 1 | -1 | -1 | -1 | 0 | 1 | 1 | 1 | 1 | 1 | 1 | 1 | 1 | 1 | 1 | 1 | 1 | 1 | 1 |
| 6 | 6 | 6 | 7 | -1 | -1 | -1 | -1 | 0 | 1 | -1 | -1 | -1 | -1 | 0 | 1 | -1 | -1 | -1 | -1 | 0 | 1 | -1 | -1 | -1 | -1 | 0 | 1 | 0 | 0 | 1 | 1 | 1 | 1 | 1 | 1 | 1 | 1 | 1 | 1 |
| | | 7 | 3 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 8 | 3 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 9 | 4 | 0 | 0 | 1 | 1 | 1 | 1 | 0 | 0 | 1 | 1 | 1 | 1 | 0 | 0 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| | | 10 | 5 | -1 | -1 | 0 | 1 | 1 | 1 | -1 | -1 | 0 | 1 | 1 | 1 | -1 | -1 | 0 | 1 | 1 | 1 | -1 | -1 | 0 | 1 | 1 | 1 | 1 | 1 | 1 | 1 | 1 | 1 | 1 | 1 | 1 | 1 | 1 | 1 |
| | | 11 | 6 | -1 | -1 | -1 | 0 | 1 | 1 | -1 | -1 | -1 | 0 | 1 | 1 | -1 | -1 | -1 | 0 | 1 | 1 | -1 | -1 | -1 | 0 | 1 | 1 | 1 | 1 | 1 | 1 | 1 | 1 | 1 | 1 | 1 | 1 | 1 | 1 |
| | | 12 | 7 | -1 | -1 | -1 | -1 | 0 | 1 | -1 | -1 | -1 | -1 | 0 | 1 | -1 | -1 | -1 | -1 | 0 | 1 | -1 | -1 | -1 | -1 | 0 | 1 | 0 | 0 | 1 | 1 | 1 | 1 | 1 | 1 | 1 | 1 | 1 | 1 |
| | | 13 | 3 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 14 | 3 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 15 | 4 | 0 | 0 | 1 | 1 | 1 | 1 | 0 | 0 | 1 | 1 | 1 | 1 | 0 | 0 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| | | 16 | 5 | -1 | -1 | 0 | 1 | 1 | 1 | -1 | -1 | 0 | 1 | 1 | 1 | -1 | -1 | 0 | 1 | 1 | 1 | -1 | -1 | 0 | 1 | 1 | 1 | 1 | 1 | 1 | 1 | 1 | 1 | 1 | 1 | 1 | 1 | 1 | 1 |
| | | 17 | 6 | -1 | -1 | -1 | 0 | 1 | 1 | -1 | -1 | -1 | 0 | 1 | 1 | -1 | -1 | -1 | 0 | 1 | 1 | -1 | -1 | -1 | 0 | 1 | 1 | 1 | 1 | 1 | 1 | 1 | 1 | 1 | 1 | 1 | 1 | 1 | 1 |
| | | 18 | 7 | -1 | -1 | -1 | -1 | 0 | 1 | -1 | -1 | -1 | -1 | 0 | 1 | -1 | -1 | -1 | -1 | 0 | 1 | -1 | -1 | -1 | -1 | 0 | 1 | 0 | 0 | 1 | 1 | 1 | 1 | 1 | 1 | 1 | 1 | 1 | 1 |
| | | 19 | 6 | -1 | -1 | -1 | 0 | 1 | 1 | -1 | -1 | -1 | 0 | 1 | 1 | -1 | -1 | -1 | 0 | 1 | 1 | -1 | -1 | -1 | 0 | 1 | 1 | 1 | 1 | 1 | 1 | 1 | 1 | 1 | 1 | 1 | 1 | 1 | 1 |
| | | 20 | 6 | -1 | -1 | -1 | 0 | 1 | 1 | -1 | -1 | -1 | 0 | 1 | 1 | -1 | -1 | -1 | 0 | 1 | 1 | -1 | -1 | -1 | 0 | 1 | 1 | 1 | 1 | 1 | 1 | 1 | 1 | 1 | 1 | 1 | 1 | 1 | 1 |
| | | 21 | 7 | -1 | -1 | -1 | -1 | 0 | 1 | -1 | -1 | -1 | -1 | 0 | 1 | -1 | -1 | -1 | -1 | 0 | 1 | -1 | -1 | -1 | -1 | 0 | 1 | 0 | 0 | 1 | 1 | 1 | 1 | 1 | 1 | 1 | 1 | 1 | 1 |
| | | 22 | 8 | -1 | -1 | -1 | -1 | -1 | 0 | -1 | -1 | -1 | -1 | -1 | 0 | -1 | -1 | -1 | -1 | -1 | 0 | -1 | -1 | -1 | -1 | -1 | 0 | -1 | -1 | 0 | 1 | 1 | 1 | 0 | 0 | 1 | 1 | 1 | 1 |
| | | 23 | 9 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 1 | 1 | -1 | -1 | 0 | 1 | 1 | 1 |
| | | 24 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 1 | -1 | -1 | -1 | 0 | 1 | 1 |
| | | 25 | 8 | -1 | -1 | -1 | -1 | -1 | 0 | -1 | -1 | -1 | -1 | -1 | 0 | -1 | -1 | -1 | -1 | -1 | 0 | -1 | -1 | -1 | -1 | -1 | 0 | -1 | -1 | 0 | 1 | 1 | 1 | 0 | 0 | 1 | 1 | 1 | 1 |
| | | 26 | 8 | -1 | -1 | -1 | -1 | -1 | 0 | -1 | -1 | -1 | -1 | -1 | 0 | -1 | -1 | -1 | -1 | -1 | 0 | -1 | -1 | -1 | -1 | -1 | 0 | -1 | -1 | 0 | 1 | 1 | 1 | 0 | 0 | 1 | 1 | 1 | 1 |
| | | 27 | 9 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 1 | 1 | -1 | -1 | 0 | 1 | 1 | 1 |
| | | 28 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 1 | -1 | -1 | -1 | 0 | 1 | 1 |
| | | 29 | 11 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | 0 | 1 |
| | | 30 | 12 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 |
| | | 31 | 8 | -1 | -1 | -1 | -1 | -1 | 0 | -1 | -1 | -1 | -1 | -1 | 0 | -1 | -1 | -1 | -1 | -1 | 0 | -1 | -1 | -1 | -1 | -1 | 0 | -1 | -1 | 0 | 1 | 1 | 1 | 0 | 0 | 1 | 1 | 1 | 1 |
| | | 32 | 8 | -1 | -1 | -1 | -1 | -1 | 0 | -1 | -1 | -1 | -1 | -1 | 0 | -1 | -1 | -1 | -1 | -1 | 0 | -1 | -1 | -1 | -1 | -1 | 0 | -1 | -1 | 0 | 1 | 1 | 1 | 0 | 0 | 1 | 1 | 1 | 1 |
| | | 33 | 9 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 1 | 1 | -1 | -1 | 0 | 1 | 1 | 1 |
| | | 34 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 1 | -1 | -1 | -1 | 0 | 1 | 1 |
| | | 35 | 11 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | 0 | 1 |
| | | 36 | 12 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 |

| | Totals of All Outcomes | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|
| Total Amber Wins ( -1 Totals ): | 574 | = Sum: ( | 27 | 27 | 24 | 19 | 15 | 10 | 27 | 27 | 24 | 19 | 15 | 10 | 27 | 27 | 24 | 19 | 15 | 10 | 27 | 27 | 24 | 19 | 15 | 10 | 15 | 15 | 10 | 7 | 4 | 2 | 10 | 10 | 7 | 4 | 2 | 0 | ) |
| Total Red Wins ( +1 Totals ): | 589 | = Sum: ( | 6 | 6 | 9 | 12 | 17 | 21 | 6 | 6 | 9 | 12 | 17 | 21 | 6 | 6 | 9 | 12 | 17 | 21 | 6 | 6 | 9 | 12 | 17 | 21 | 17 | 17 | 21 | 26 | 29 | 32 | 21 | 21 | 26 | 29 | 32 | 34 | ) |
| Total Amber and Red Tie ( 0 Totals): | 133 | = Sum: ( | 3 | 3 | 3 | 5 | 4 | 5 | 3 | 3 | 3 | 5 | 4 | 5 | 3 | 3 | 3 | 5 | 4 | 5 | 3 | 3 | 3 | 5 | 4 | 5 | 4 | 4 | 5 | 3 | 3 | 2 | 5 | 5 | 3 | 3 | 2 | 2 | ) |
| Check -- Total of All Outcomes (= 36 x 36): | 1,296 | | | | | | | | | | | | | | | | | | | | | | | | | | | | | | | | | | | | | |

44.2901% = Probability that Amber Wins the Roll
45.4475% = Probability that Red Wins the Roll
10.2623% = Probability that Amber and Red Tie on the Roll
1.1574% = The Edge Red has over Amber

Fig. 10

Table 724 - Gaming Elements 710

All Single Roll Probabilities for Blue Pair 714 (a,b) vs. Amber Pair 716 (a,b)

Amber Pair 716 Pips: Amber 716b: 1 1 1 4 6 6
Amber 716a: 2 2 3 4 5 6

In the Table Below, -1 Means that Amber Loses to Blue
In the Table Below, +1 Means that Blue Loses to Amber
In the Table Below, 0 Means that Pairs Blue & Amber Tie Blue Pair 714 Pips

| 714b | 714a | 36 Blue Possibilities | 36 Amber Possibilities: | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|---|---|
| | | | Amber Total: | 3 | 3 | 3 | 6 | 8 | 8 | 3 | 3 | 3 | 6 | 8 | 8 | 4 | 4 | 4 | 7 | 9 | 9 | 5 | 5 | 5 | 8 | 10 | 10 | 6 | 6 | 6 | 9 | 11 | 11 | 7 | 7 | 7 | 10 | 12 | 12 |
| | | | Blue total | | | | | | | | | | | | | | | | | | | | | | | | | | | | | | | | | | | | |
| 1 | 1 | 1 | 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 1 | 2 | 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 5 | 3 | 3 | 4 | -1 | -1 | -1 | 1 | 1 | 1 | -1 | -1 | -1 | 1 | 1 | 1 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 |
| 5 | 3 | 4 | 4 | -1 | -1 | -1 | 1 | 1 | 1 | -1 | -1 | -1 | 1 | 1 | 1 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 |
| 5 | 4 | 5 | 5 | -1 | -1 | -1 | 1 | 1 | 1 | -1 | -1 | -1 | 1 | 1 | 1 | -1 | -1 | -1 | 1 | 1 | 1 | 0 | 0 | 0 | 1 | 1 | 1 | 1 | 1 | 1 | 1 | 1 | 1 | 1 | 1 | 1 | 1 | 1 | 1 |
| 6 | 4 | 6 | 5 | -1 | -1 | -1 | 1 | 1 | 1 | -1 | -1 | -1 | 1 | 1 | 1 | -1 | -1 | -1 | 1 | 1 | 1 | 0 | 0 | 0 | 1 | 1 | 1 | 1 | 1 | 1 | 1 | 1 | 1 | 1 | 1 | 1 | 1 | 1 | 1 |
| | | 7 | 3 | 0 | 0 | 0 | 1 | 1 | 1 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 8 | 3 | 0 | 0 | 0 | 1 | 1 | 1 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 9 | 5 | -1 | -1 | -1 | 1 | 1 | 1 | -1 | -1 | -1 | 1 | 1 | 1 | -1 | -1 | -1 | 1 | 1 | 1 | 0 | 0 | 0 | 1 | 1 | 1 | 1 | 1 | 1 | 1 | 1 | 1 | 1 | 1 | 1 | 1 | 1 | 1 |
| | | 10 | 5 | -1 | -1 | -1 | 1 | 1 | 1 | -1 | -1 | -1 | 1 | 1 | 1 | -1 | -1 | -1 | 1 | 1 | 1 | 0 | 0 | 0 | 1 | 1 | 1 | 1 | 1 | 1 | 1 | 1 | 1 | 1 | 1 | 1 | 1 | 1 | 1 |
| | | 11 | 6 | -1 | -1 | -1 | 0 | 1 | 1 | -1 | -1 | -1 | 0 | 1 | 1 | -1 | -1 | -1 | 1 | 1 | 1 | -1 | -1 | -1 | 1 | 1 | 1 | 0 | 0 | 0 | 1 | 1 | 1 | 1 | 1 | 1 | 1 | 1 | 1 |
| | | 12 | 6 | -1 | -1 | -1 | 0 | 1 | 1 | -1 | -1 | -1 | 0 | 1 | 1 | -1 | -1 | -1 | 1 | 1 | 1 | -1 | -1 | -1 | 1 | 1 | 1 | 0 | 0 | 0 | 1 | 1 | 1 | 1 | 1 | 1 | 1 | 1 | 1 |
| | | 13 | 6 | -1 | -1 | -1 | 0 | 1 | 1 | -1 | -1 | -1 | 0 | 1 | 1 | -1 | -1 | -1 | 1 | 1 | 1 | -1 | -1 | -1 | 1 | 1 | 1 | 0 | 0 | 0 | 1 | 1 | 1 | 1 | 1 | 1 | 1 | 1 | 1 |
| | | 14 | 6 | -1 | -1 | -1 | 0 | 1 | 1 | -1 | -1 | -1 | 0 | 1 | 1 | -1 | -1 | -1 | 1 | 1 | 1 | -1 | -1 | -1 | 1 | 1 | 1 | 0 | 0 | 0 | 1 | 1 | 1 | 1 | 1 | 1 | 1 | 1 | 1 |
| | | 15 | 8 | -1 | -1 | -1 | -1 | 0 | 0 | -1 | -1 | -1 | -1 | 0 | 0 | -1 | -1 | -1 | -1 | 1 | 1 | -1 | -1 | -1 | 0 | 1 | 1 | -1 | -1 | -1 | 1 | 1 | 1 | -1 | -1 | -1 | 1 | 1 | 1 |
| | | 16 | 8 | -1 | -1 | -1 | -1 | 0 | 0 | -1 | -1 | -1 | -1 | 0 | 0 | -1 | -1 | -1 | -1 | 1 | 1 | -1 | -1 | -1 | 0 | 1 | 1 | -1 | -1 | -1 | 1 | 1 | 1 | -1 | -1 | -1 | 1 | 1 | 1 |
| | | 17 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | 0 | 1 | 1 | -1 | -1 | -1 | 1 | 1 | 1 |
| | | 18 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | 0 | 1 | 1 | -1 | -1 | -1 | 1 | 1 | 1 |
| | | 19 | 6 | -1 | -1 | -1 | 0 | 1 | 1 | -1 | -1 | -1 | 0 | 1 | 1 | -1 | -1 | -1 | 1 | 1 | 1 | -1 | -1 | -1 | 1 | 1 | 1 | 0 | 0 | 0 | 1 | 1 | 1 | 1 | 1 | 1 | 1 | 1 | 1 |
| | | 20 | 6 | -1 | -1 | -1 | 0 | 1 | 1 | -1 | -1 | -1 | 0 | 1 | 1 | -1 | -1 | -1 | 1 | 1 | 1 | -1 | -1 | -1 | 1 | 1 | 1 | 0 | 0 | 0 | 1 | 1 | 1 | 1 | 1 | 1 | 1 | 1 | 1 |
| | | 21 | 8 | -1 | -1 | -1 | -1 | 0 | 0 | -1 | -1 | -1 | -1 | 0 | 0 | -1 | -1 | -1 | -1 | 1 | 1 | -1 | -1 | -1 | 0 | 1 | 1 | -1 | -1 | -1 | 1 | 1 | 1 | -1 | -1 | -1 | 1 | 1 | 1 |
| | | 22 | 8 | -1 | -1 | -1 | -1 | 0 | 0 | -1 | -1 | -1 | -1 | 0 | 0 | -1 | -1 | -1 | -1 | 1 | 1 | -1 | -1 | -1 | 0 | 1 | 1 | -1 | -1 | -1 | 1 | 1 | 1 | -1 | -1 | -1 | 1 | 1 | 1 |
| | | 23 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | 0 | 1 | 1 | -1 | -1 | -1 | 1 | 1 | 1 |
| | | 24 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | 0 | 1 | 1 | -1 | -1 | -1 | 1 | 1 | 1 |
| | | 25 | 6 | -1 | -1 | -1 | 0 | 1 | 1 | -1 | -1 | -1 | 0 | 1 | 1 | -1 | -1 | -1 | 1 | 1 | 1 | -1 | -1 | -1 | 1 | 1 | 1 | 0 | 0 | 0 | 1 | 1 | 1 | 1 | 1 | 1 | 1 | 1 | 1 |
| | | 26 | 6 | -1 | -1 | -1 | 0 | 1 | 1 | -1 | -1 | -1 | 0 | 1 | 1 | -1 | -1 | -1 | 1 | 1 | 1 | -1 | -1 | -1 | 1 | 1 | 1 | 0 | 0 | 0 | 1 | 1 | 1 | 1 | 1 | 1 | 1 | 1 | 1 |
| | | 27 | 8 | -1 | -1 | -1 | -1 | 0 | 0 | -1 | -1 | -1 | -1 | 0 | 0 | -1 | -1 | -1 | -1 | 1 | 1 | -1 | -1 | -1 | 0 | 1 | 1 | -1 | -1 | -1 | 1 | 1 | 1 | -1 | -1 | -1 | 1 | 1 | 1 |
| | | 28 | 8 | -1 | -1 | -1 | -1 | 0 | 0 | -1 | -1 | -1 | -1 | 0 | 0 | -1 | -1 | -1 | -1 | 1 | 1 | -1 | -1 | -1 | 0 | 1 | 1 | -1 | -1 | -1 | 1 | 1 | 1 | -1 | -1 | -1 | 1 | 1 | 1 |
| | | 29 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | 0 | 1 | 1 | -1 | -1 | -1 | 1 | 1 | 1 |
| | | 30 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | 0 | 1 | 1 | -1 | -1 | -1 | 1 | 1 | 1 |
| | | 31 | 7 | -1 | -1 | -1 | -1 | 1 | 1 | -1 | -1 | -1 | -1 | 1 | 1 | -1 | -1 | -1 | 0 | 1 | 1 | -1 | -1 | -1 | 1 | 1 | 1 | -1 | -1 | -1 | 1 | 1 | 1 | 0 | 0 | 0 | 1 | 1 | 1 |
| | | 32 | 7 | -1 | -1 | -1 | -1 | 1 | 1 | -1 | -1 | -1 | -1 | 1 | 1 | -1 | -1 | -1 | 0 | 1 | 1 | -1 | -1 | -1 | 1 | 1 | 1 | -1 | -1 | -1 | 1 | 1 | 1 | 0 | 0 | 0 | 1 | 1 | 1 |
| | | 33 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | 0 | 1 | 1 | -1 | -1 | -1 | 1 | 1 | 1 |
| | | 34 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | 0 | 1 | 1 | -1 | -1 | -1 | 1 | 1 | 1 |
| | | 35 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | 0 | 1 | 1 |
| | | 36 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | 0 | 1 | 1 |

Totals of All Outcomes

Total Blue Wins ( -1 Totals ): 570 = Sum: { 32 32 32 18 10 10 32 32 32 18 10 10 30 30 30 16 2 2 26 26 26 10 0 0 18 18 18 2 0 0 16 16 16 0 0 0 }

Total Amber Wins ( +1 Totals ): 588 = Sum: { 2 2 2 10 20 20 2 2 2 10 20 20 4 4 4 18 26 26 6 6 6 20 34 34 10 10 10 26 36 36 18 18 18 34 36 36 }

Total Blue and Amber Tie ( 0 Totals): 138 = Sum: { 2 2 2 8 6 6 2 2 2 8 6 6 2 2 2 2 8 8 4 4 4 6 2 2 8 8 8 8 0 0 2 2 2 2 0 0 }

Check -- Total of All Outcomes (= 36 x 36): 1,296

44.4444% = Probability that Blue Wins the Roll 45.3704% = Probability that Amber Wins the Roll 10.6481% = Probability that Blue and Amber Tie on the Roll 0.9259% = The Edge Amber has over Blue

Fig 11

Table 820 - Gaming Elements 810

All Single Roll Probabilities for Red Pair 812 (a,b) vs. Blue Pair 814 (a,b)

| Blue Pair 814 Pips: | | | | | | | |
|---|---|---|---|---|---|---|---|
| | Blue814b: | 1 | 1 | 2 | 3 | 5 | 6 |
| | Blue 814a: | 2 | 3 | 4 | 4 | 5 | 5 |

In the Table Below, -1 Means that Blue Loses to Red
In the Table Below, +1 Means that Red Loses to Blue
In the Table Below, 0 Means that Red & Blue Tie

| Red Pair 812 Pips 812a | 812b | 36 Pair Red Possibilities | Pair Red Totals | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|---|---|
| | | All Blue Totals: | | 3 | 3 | 4 | 5 | 7 | 8 | 4 | 4 | 5 | 6 | 8 | 9 | 5 | 5 | 6 | 7 | 9 | 10 | 5 | 5 | 6 | 7 | 9 | 10 | 6 | 6 | 7 | 8 | 10 | 11 | 6 | 6 | 7 | 8 | 10 | 11 |
| 2 | 1 | 1 | 3 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | 1 | 2 | 3 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | 3 | 3 | 5 | -1 | -1 | -1 | 0 | 1 | 1 | -1 | -1 | 0 | 1 | 1 | 1 | 0 | 0 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| 3 | 4 | 4 | 6 | -1 | -1 | -1 | -1 | 1 | 1 | -1 | -1 | -1 | 0 | 1 | 1 | -1 | -1 | 0 | 1 | 1 | 1 | -1 | -1 | 0 | 1 | 1 | 1 | 0 | 0 | 1 | 1 | 1 | 1 | 0 | 0 | 1 | 1 | 1 | 1 |
| 3 | 6 | 5 | 8 | -1 | -1 | -1 | -1 | -1 | 0 | -1 | -1 | -1 | -1 | 0 | 1 | -1 | -1 | -1 | -1 | 1 | 1 | -1 | -1 | -1 | -1 | 1 | 1 | -1 | -1 | -1 | 0 | 1 | 1 | -1 | -1 | -1 | 0 | 1 | 1 |
| 6 | 6 | 6 | 8 | -1 | -1 | -1 | -1 | -1 | 0 | -1 | -1 | -1 | -1 | 0 | 1 | -1 | -1 | -1 | -1 | 1 | 1 | -1 | -1 | -1 | -1 | 1 | 1 | -1 | -1 | -1 | 0 | 1 | 1 | -1 | -1 | -1 | 0 | 1 | 1 |
| | | 7 | 4 | -1 | -1 | 0 | 1 | 1 | 1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 8 | 4 | -1 | -1 | 0 | 1 | 1 | 1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 9 | 6 | -1 | -1 | -1 | -1 | 1 | 1 | -1 | -1 | -1 | 0 | 1 | 1 | -1 | -1 | 0 | 1 | 1 | 1 | -1 | -1 | 0 | 1 | 1 | 1 | 0 | 0 | 1 | 1 | 1 | 1 | 0 | 0 | 1 | 1 | 1 | 1 |
| | | 10 | 7 | -1 | -1 | -1 | -1 | 0 | 1 | -1 | -1 | -1 | -1 | 1 | 1 | -1 | -1 | -1 | 0 | 1 | 1 | -1 | -1 | -1 | 0 | 1 | 1 | -1 | -1 | 0 | 1 | 1 | 1 | -1 | -1 | 0 | 1 | 1 | 1 |
| | | 11 | 9 | -1 | -1 | -1 | -1 | -1 | -1 | -1 | -1 | -1 | -1 | -1 | 0 | -1 | -1 | -1 | -1 | 0 | 1 | -1 | -1 | -1 | -1 | 0 | 1 | -1 | -1 | -1 | -1 | 1 | 1 | -1 | -1 | -1 | -1 | 1 | 1 |
| | | 12 | 9 | -1 | -1 | -1 | -1 | -1 | -1 | -1 | -1 | -1 | -1 | -1 | 0 | -1 | -1 | -1 | -1 | 0 | 1 | -1 | -1 | -1 | -1 | 0 | 1 | -1 | -1 | -1 | -1 | 1 | 1 | -1 | -1 | -1 | -1 | 1 | 1 |
| | | 13 | 4 | -1 | -1 | 0 | 1 | 1 | 1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 14 | 4 | -1 | -1 | 0 | 1 | 1 | 1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 15 | 6 | -1 | -1 | -1 | -1 | 1 | 1 | -1 | -1 | -1 | 0 | 1 | 1 | -1 | -1 | 0 | 1 | 1 | 1 | -1 | -1 | 0 | 1 | 1 | 1 | 0 | 0 | 1 | 1 | 1 | 1 | 0 | 0 | 1 | 1 | 1 | 1 |
| | | 16 | 7 | -1 | -1 | -1 | -1 | 0 | 1 | -1 | -1 | -1 | -1 | 1 | 1 | -1 | -1 | -1 | 0 | 1 | 1 | -1 | -1 | -1 | 0 | 1 | 1 | -1 | -1 | 0 | 1 | 1 | 1 | -1 | -1 | 0 | 1 | 1 | 1 |
| | | 17 | 9 | -1 | -1 | -1 | -1 | -1 | -1 | -1 | -1 | -1 | -1 | -1 | 0 | -1 | -1 | -1 | -1 | 0 | 1 | -1 | -1 | -1 | -1 | 0 | 1 | -1 | -1 | -1 | -1 | 1 | 1 | -1 | -1 | -1 | -1 | 1 | 1 |
| | | 18 | 9 | -1 | -1 | -1 | -1 | -1 | -1 | -1 | -1 | -1 | -1 | -1 | 0 | -1 | -1 | -1 | -1 | 0 | 1 | -1 | -1 | -1 | -1 | 0 | 1 | -1 | -1 | -1 | -1 | 1 | 1 | -1 | -1 | -1 | -1 | 1 | 1 |
| | | 19 | 4 | -1 | -1 | 0 | 1 | 1 | 1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 20 | 4 | -1 | -1 | 0 | 1 | 1 | 1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 21 | 6 | -1 | -1 | -1 | -1 | 1 | 1 | -1 | -1 | -1 | 0 | 1 | 1 | -1 | -1 | 0 | 1 | 1 | 1 | -1 | -1 | 0 | 1 | 1 | 1 | 0 | 0 | 1 | 1 | 1 | 1 | 0 | 0 | 1 | 1 | 1 | 1 |
| | | 22 | 7 | -1 | -1 | -1 | -1 | 0 | 1 | -1 | -1 | -1 | -1 | 1 | 1 | -1 | -1 | -1 | 0 | 1 | 1 | -1 | -1 | -1 | 0 | 1 | 1 | -1 | -1 | 0 | 1 | 1 | 1 | -1 | -1 | 0 | 1 | 1 | 1 |
| | | 23 | 9 | -1 | -1 | -1 | -1 | -1 | -1 | -1 | -1 | -1 | -1 | -1 | 0 | -1 | -1 | -1 | -1 | 0 | 1 | -1 | -1 | -1 | -1 | 0 | 1 | -1 | -1 | -1 | -1 | 1 | 1 | -1 | -1 | -1 | -1 | 1 | 1 |
| | | 24 | 9 | -1 | -1 | -1 | -1 | -1 | -1 | -1 | -1 | -1 | -1 | -1 | 0 | -1 | -1 | -1 | -1 | 0 | 1 | -1 | -1 | -1 | -1 | 0 | 1 | -1 | -1 | -1 | -1 | 1 | 1 | -1 | -1 | -1 | -1 | 1 | 1 |
| | | 25 | 4 | -1 | -1 | 0 | 1 | 1 | 1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 26 | 4 | -1 | -1 | 0 | 1 | 1 | 1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 27 | 6 | -1 | -1 | -1 | -1 | 1 | 1 | -1 | -1 | -1 | 0 | 1 | 1 | -1 | -1 | 0 | 1 | 1 | 1 | -1 | -1 | 0 | 1 | 1 | 1 | 0 | 0 | 1 | 1 | 1 | 1 | 0 | 0 | 1 | 1 | 1 | 1 |
| | | 28 | 7 | -1 | -1 | -1 | -1 | 0 | 1 | -1 | -1 | -1 | -1 | 1 | 1 | -1 | -1 | -1 | 0 | 1 | 1 | -1 | -1 | -1 | 0 | 1 | 1 | -1 | -1 | 0 | 1 | 1 | 1 | -1 | -1 | 0 | 1 | 1 | 1 |
| | | 29 | 9 | -1 | -1 | -1 | -1 | -1 | -1 | -1 | -1 | -1 | -1 | -1 | 0 | -1 | -1 | -1 | -1 | 0 | 1 | -1 | -1 | -1 | -1 | 0 | 1 | -1 | -1 | -1 | -1 | 1 | 1 | -1 | -1 | -1 | -1 | 1 | 1 |
| | | 30 | 9 | -1 | -1 | -1 | -1 | -1 | -1 | -1 | -1 | -1 | -1 | -1 | 0 | -1 | -1 | -1 | -1 | 0 | 1 | -1 | -1 | -1 | -1 | 0 | 1 | -1 | -1 | -1 | -1 | 1 | 1 | -1 | -1 | -1 | -1 | 1 | 1 |
| | | 31 | 7 | -1 | -1 | -1 | -1 | 0 | 1 | -1 | -1 | -1 | -1 | 1 | 1 | -1 | -1 | -1 | 0 | 1 | 1 | -1 | -1 | -1 | 0 | 1 | 1 | -1 | -1 | 0 | 1 | 1 | 1 | -1 | -1 | 0 | 1 | 1 | 1 |
| | | 32 | 7 | -1 | -1 | -1 | -1 | 0 | 1 | -1 | -1 | -1 | -1 | 1 | 1 | -1 | -1 | -1 | 0 | 1 | 1 | -1 | -1 | -1 | 0 | 1 | 1 | -1 | -1 | 0 | 1 | 1 | 1 | -1 | -1 | 0 | 1 | 1 | 1 |
| | | 33 | 9 | -1 | -1 | -1 | -1 | -1 | -1 | -1 | -1 | -1 | -1 | -1 | 0 | -1 | -1 | -1 | -1 | 0 | 1 | -1 | -1 | -1 | -1 | 0 | 1 | -1 | -1 | -1 | -1 | 1 | 1 | -1 | -1 | -1 | -1 | 1 | 1 |
| | | 34 | 10 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 0 | -1 | -1 | -1 | -1 | 0 | 1 | -1 | -1 | -1 | -1 | 0 | 1 |
| | | 35 | 12 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |
| | | 36 | 12 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |

| | Totals of All Outcomes | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|---|
| Total Red Wins ( -1 Totals ): | 575 | = Sum: { | 34 | 34 | 26 | 25 | 14 | 12 | 26 | 26 | 25 | 20 | 12 | 3 | 25 | 25 | 20 | 14 | 3 | 2 | 25 | 25 | 20 | 14 | 3 | 2 | 20 | 20 | 14 | 12 | 2 | 2 | 20 | 20 | 14 | 12 | 2 | 2 } |
| Total Blue Wins ( +1 Totals ): | 583 | = Sum: { | 0 | 0 | 2 | 10 | 16 | 22 | 2 | 2 | 10 | 11 | 22 | 34 | 10 | 10 | 11 | 16 | 24 | 33 | 10 | 10 | 11 | 16 | 24 | 33 | 11 | 11 | 16 | 22 | 33 | 34 | 11 | 11 | 16 | 22 | 33 | 34 } |
| Total Red and Blue Tie ( 0 Totals): | 138 | = Sum: { | 2 | 2 | 8 | 1 | 6 | 2 | 8 | 8 | 1 | 5 | 2 | 9 | 1 | 1 | 5 | 6 | 9 | 1 | 1 | 1 | 5 | 6 | 9 | 1 | 5 | 5 | 6 | 2 | 1 | 0 | 5 | 5 | 6 | 2 | 1 | 0 } |
| ck. -- Total of All Outcomes (= 36 x 36): | 1,296 | | | | | | | | | | | | | | | | | | | | | | | | | | | | | | | | | | | | | |

44.3673% = Probability that Red Wins the Roll
44.9846% = Probability that Blue Wins the Roll
10.6481% = Probability that Red and Blue Tie on the Roll
0.6173% = The Edge Blue has over Red

Fig. 15

Table 822 - Gaming Elements 810

All Single Roll Probabilities for Amber Pair 816 (a,b) vs. Red Pair 812 (a,b)

Red Pair 812 Pips:

| | | | | | | |
|---|---|---|---|---|---|---|
| Red 812a: | 2 | 3 | 3 | 3 | 3 | 6 |
| Red 812b: | 1 | 1 | 3 | 4 | 6 | 6 |

In the Table Below, -1 Means that Red Loses to Amber
In the Table Below, +1 Means that Amber Loses to Red
In the Table Below, 0 Means that Amber & Red Tie Amber 816 Pips

| 816b | 816a |
|---|---|
| 1 | 1 |
| 1 | 1 |
| 1 | 5 |
| 3 | 6 |
| 4 | 6 |
| 5 | 6 |

| All 36 Red Possibilities | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|
| | All Red Totals: | 3 | 4 | 4 | 4 | 4 | 7 | 3 | 4 | 4 | 4 | 4 | 7 | 5 | 6 | 6 | 6 | 6 | 9 | 6 | 7 | 7 | 7 | 7 | 10 | 8 | 9 | 9 | 9 | 9 | 12 | 8 | 9 | 9 | 9 | 9 | 12 |
| 36 Pair Amber Possibilities | All Amber Totals | | | | | | | | | | | | | | | | | | | | | | | | | | | | | | | | | | | | |
| 1 | 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | 6 | -1 | -1 | -1 | -1 | -1 | 1 | -1 | -1 | -1 | -1 | -1 | 1 | -1 | 0 | 0 | 0 | 0 | 1 | 0 | 1 | 1 | 1 | 1 | 1 | 1 | 1 | 1 | 1 | 1 | 1 | 1 | 1 | 1 | 1 | 1 | 1 |
| 4 | 7 | -1 | -1 | -1 | -1 | -1 | 0 | -1 | -1 | -1 | -1 | -1 | 0 | -1 | -1 | -1 | -1 | -1 | 1 | -1 | 0 | 0 | 0 | 0 | 1 | 1 | 1 | 1 | 1 | 1 | 1 | 1 | 1 | 1 | 1 | 1 | 1 |
| 5 | 7 | -1 | -1 | -1 | -1 | -1 | 0 | -1 | -1 | -1 | -1 | -1 | 0 | -1 | -1 | -1 | -1 | -1 | 1 | -1 | 0 | 0 | 0 | 0 | 1 | 1 | 1 | 1 | 1 | 1 | 1 | 1 | 1 | 1 | 1 | 1 | 1 |
| 6 | 7 | -1 | -1 | -1 | -1 | -1 | 0 | -1 | -1 | -1 | -1 | -1 | 0 | -1 | -1 | -1 | -1 | -1 | 1 | -1 | 0 | 0 | 0 | 0 | 1 | 1 | 1 | 1 | 1 | 1 | 1 | 1 | 1 | 1 | 1 | 1 | 1 |
| 7 | 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 8 | 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 9 | 6 | -1 | -1 | -1 | -1 | -1 | 1 | -1 | -1 | -1 | -1 | -1 | 1 | -1 | 0 | 0 | 0 | 0 | 1 | 0 | 1 | 1 | 1 | 1 | 1 | 1 | 1 | 1 | 1 | 1 | 1 | 1 | 1 | 1 | 1 | 1 | 1 |
| 10 | 7 | -1 | -1 | -1 | -1 | -1 | 0 | -1 | -1 | -1 | -1 | -1 | 0 | -1 | -1 | -1 | -1 | -1 | 1 | -1 | 0 | 0 | 0 | 0 | 1 | 1 | 1 | 1 | 1 | 1 | 1 | 1 | 1 | 1 | 1 | 1 | 1 |
| 11 | 7 | -1 | -1 | -1 | -1 | -1 | 0 | -1 | -1 | -1 | -1 | -1 | 0 | -1 | -1 | -1 | -1 | -1 | 1 | -1 | 0 | 0 | 0 | 0 | 1 | 1 | 1 | 1 | 1 | 1 | 1 | 1 | 1 | 1 | 1 | 1 | 1 |
| 12 | 7 | -1 | -1 | -1 | -1 | -1 | 0 | -1 | -1 | -1 | -1 | -1 | 0 | -1 | -1 | -1 | -1 | -1 | 1 | -1 | 0 | 0 | 0 | 0 | 1 | 1 | 1 | 1 | 1 | 1 | 1 | 1 | 1 | 1 | 1 | 1 | 1 |
| 13 | 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 14 | 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 15 | 6 | -1 | -1 | -1 | -1 | -1 | 1 | -1 | -1 | -1 | -1 | -1 | 1 | -1 | 0 | 0 | 0 | 0 | 1 | 0 | 1 | 1 | 1 | 1 | 1 | 1 | 1 | 1 | 1 | 1 | 1 | 1 | 1 | 1 | 1 | 1 | 1 |
| 16 | 7 | -1 | -1 | -1 | -1 | -1 | 0 | -1 | -1 | -1 | -1 | -1 | 0 | -1 | -1 | -1 | -1 | -1 | 1 | -1 | 0 | 0 | 0 | 0 | 1 | 1 | 1 | 1 | 1 | 1 | 1 | 1 | 1 | 1 | 1 | 1 | 1 |
| 17 | 7 | -1 | -1 | -1 | -1 | -1 | 0 | -1 | -1 | -1 | -1 | -1 | 0 | -1 | -1 | -1 | -1 | -1 | 1 | -1 | 0 | 0 | 0 | 0 | 1 | 1 | 1 | 1 | 1 | 1 | 1 | 1 | 1 | 1 | 1 | 1 | 1 |
| 18 | 7 | -1 | -1 | -1 | -1 | -1 | 0 | -1 | -1 | -1 | -1 | -1 | 0 | -1 | -1 | -1 | -1 | -1 | 1 | -1 | 0 | 0 | 0 | 0 | 1 | 1 | 1 | 1 | 1 | 1 | 1 | 1 | 1 | 1 | 1 | 1 | 1 |
| 19 | 4 | -1 | 0 | 0 | 0 | 0 | 1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 20 | 4 | -1 | 0 | 0 | 0 | 0 | 1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 21 | 8 | -1 | -1 | -1 | -1 | -1 | -1 | -1 | -1 | -1 | -1 | -1 | -1 | -1 | -1 | -1 | -1 | -1 | 1 | -1 | -1 | -1 | -1 | -1 | 1 | 0 | 1 | 1 | 1 | 1 | 1 | 0 | 1 | 1 | 1 | 1 | 1 |
| 22 | 9 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 1 | -1 | 0 | 0 | 0 | 0 | 1 | -1 | 0 | 0 | 0 | 0 | 1 |
| 23 | 9 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 1 | -1 | 0 | 0 | 0 | 0 | 1 | -1 | 0 | 0 | 0 | 0 | 1 |
| 24 | 9 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 1 | -1 | 0 | 0 | 0 | 0 | 1 | -1 | 0 | 0 | 0 | 0 | 1 |
| 25 | 5 | -1 | -1 | -1 | -1 | -1 | 1 | -1 | -1 | -1 | -1 | -1 | 1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 26 | 5 | -1 | -1 | -1 | -1 | -1 | 1 | -1 | -1 | -1 | -1 | -1 | 1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 27 | 9 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 1 | -1 | 0 | 0 | 0 | 0 | 1 | -1 | 0 | 0 | 0 | 0 | 1 |
| 28 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 1 | -1 | -1 | -1 | -1 | -1 | 1 |
| 29 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 1 | -1 | -1 | -1 | -1 | -1 | 1 |
| 30 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 1 | -1 | -1 | -1 | -1 | -1 | 1 |
| 31 | 6 | -1 | -1 | -1 | -1 | -1 | 1 | -1 | -1 | -1 | -1 | -1 | 1 | -1 | 0 | 0 | 0 | 0 | 1 | 0 | 1 | 1 | 1 | 1 | 1 | 1 | 1 | 1 | 1 | 1 | 1 | 1 | 1 | 1 | 1 | 1 | 1 |
| 32 | 6 | -1 | -1 | -1 | -1 | -1 | 1 | -1 | -1 | -1 | -1 | -1 | 1 | -1 | 0 | 0 | 0 | 0 | 1 | 0 | 1 | 1 | 1 | 1 | 1 | 1 | 1 | 1 | 1 | 1 | 1 | 1 | 1 | 1 | 1 | 1 | 1 |
| 33 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 1 | -1 | -1 | -1 | -1 | -1 | 1 |
| 34 | 11 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 1 | -1 | -1 | -1 | -1 | -1 | 1 |
| 35 | 11 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 1 | -1 | -1 | -1 | -1 | -1 | 1 |
| 36 | 11 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 1 | -1 | -1 | -1 | -1 | -1 | 1 |

| | Totals of All Outcomes | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|
| Total Amber Wins ( -1 Totals ): | 575 | = Sum ( | 30 | 28 | 28 | 28 | 28 | 12 | 30 | 28 | 28 | 28 | 28 | 12 | 26 | 21 | 21 | 21 | 21 | 7 | 21 | 12 | 12 | 12 | 12 | 3 | 11 | 7 | 7 | 7 | 7 | 0 | 11 | 7 | 7 | 7 | 7 | 0 ) |
| Total Red Wins ( +1 Totals ): | 582 | = Sum ( | 6 | 6 | 6 | 6 | 6 | 15 | 6 | 6 | 6 | 6 | 6 | 15 | 8 | 10 | 10 | 10 | 10 | 25 | 10 | 15 | 15 | 15 | 15 | 29 | 24 | 25 | 25 | 25 | 25 | 36 | 24 | 25 | 25 | 25 | 25 | 36 ) |
| Total Amber and Red Tie ( 0 Totals ): | 139 | = Sum ( | 0 | 2 | 2 | 2 | 2 | 9 | 0 | 2 | 2 | 2 | 2 | 9 | 2 | 5 | 5 | 5 | 5 | 4 | 5 | 9 | 9 | 9 | 9 | 4 | 1 | 4 | 4 | 4 | 4 | 0 | 1 | 4 | 4 | 4 | 4 | 0 ) |
| Check -- Total of All Outcomes (= 36 x 36): | 1,296 | | | | | | | | | | | | | | | | | | | | | | | | | | | | | | | | | | | | | | |

44.3673% = Probability that Amber Wins the Roll
44.9074% = Probability that Red Wins the Roll
10.7253% = Probability that Amber and Red Tie on the Roll
0.5401% = The Edge Red has over Amber

Fig. 16

Table 824 - Gaming Elements 810

All Single Roll Probabilities for Blue Pair 814 (a,b) vs. Amber Pair 816 (a,b)

| Amber Pair 816 Pips: | | | | | | |
|---|---|---|---|---|---|---|
| Amber 816b: | 1 | 1 | 1 | 3 | 4 | 5 |
| Amber 816a: | 1 | 1 | 5 | 6 | 6 | 6 |

In the Table Below, -1 Means that Amber Loses to Blue
In the Table Below, +1 Means that Blue Loses to Amber
In the Table Below, 0 Means that Pairs Blue & Amber Tie Blue Pair 814 Pips

| 814b | 814a |
|---|---|
| 1 | 2 |
| 1 | 3 |
| 2 | 4 |
| 3 | 4 |
| 5 | 5 |
| 6 | 5 |

| 36 Blue Possibilities | Blue Total | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|
| | Amber Total: | 2 | 2 | 2 | 4 | 5 | 6 | 2 | 2 | 2 | 4 | 5 | 6 | 6 | 6 | 6 | 8 | 9 | 10 | 7 | 7 | 7 | 9 | 10 | 11 | 7 | 7 | 7 | 9 | 10 | 11 | 7 | 7 | 7 | 9 | 10 | 11 |
| 1 | 3 | -1 | -1 | -1 | 1 | 1 | 1 | -1 | -1 | -1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 4 | -1 | -1 | -1 | 0 | 1 | 1 | -1 | -1 | -1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | 5 | -1 | -1 | -1 | -1 | 0 | 1 | -1 | -1 | -1 | -1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 4 | 5 | -1 | -1 | -1 | -1 | 0 | 1 | -1 | -1 | -1 | -1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 5 | 6 | -1 | -1 | -1 | -1 | -1 | 0 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 |
| 6 | 6 | -1 | -1 | -1 | -1 | -1 | 0 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 |
| 7 | 3 | -1 | -1 | -1 | 1 | 1 | 1 | -1 | -1 | -1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 8 | 4 | -1 | -1 | -1 | 0 | 1 | 1 | -1 | -1 | -1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 9 | 5 | -1 | -1 | -1 | -1 | 0 | 1 | -1 | -1 | -1 | -1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 10 | 5 | -1 | -1 | -1 | -1 | 0 | 1 | -1 | -1 | -1 | -1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 11 | 6 | -1 | -1 | -1 | -1 | -1 | 0 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 |
| 12 | 6 | -1 | -1 | -1 | -1 | -1 | 0 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 |
| 13 | 4 | -1 | -1 | -1 | 0 | 1 | 1 | -1 | -1 | -1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 14 | 5 | -1 | -1 | -1 | -1 | 0 | 1 | -1 | -1 | -1 | -1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 15 | 6 | -1 | -1 | -1 | -1 | -1 | 0 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 |
| 16 | 6 | -1 | -1 | -1 | -1 | -1 | 0 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 |
| 17 | 7 | -1 | -1 | -1 | -1 | -1 | -1 | -1 | -1 | -1 | -1 | -1 | -1 | -1 | -1 | -1 | 1 | 1 | 1 | 0 | 0 | 0 | 1 | 1 | 1 | 0 | 0 | 0 | 1 | 1 | 1 | 0 | 0 | 0 | 1 | 1 | 1 |
| 18 | 7 | -1 | -1 | -1 | -1 | -1 | -1 | -1 | -1 | -1 | -1 | -1 | -1 | -1 | -1 | -1 | 1 | 1 | 1 | 0 | 0 | 0 | 1 | 1 | 1 | 0 | 0 | 0 | 1 | 1 | 1 | 0 | 0 | 0 | 1 | 1 | 1 |
| 19 | 5 | -1 | -1 | -1 | -1 | 0 | 1 | -1 | -1 | -1 | -1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 20 | 6 | -1 | -1 | -1 | -1 | -1 | 0 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 |
| 21 | 7 | -1 | -1 | -1 | -1 | -1 | -1 | -1 | -1 | -1 | -1 | -1 | -1 | -1 | -1 | -1 | 1 | 1 | 1 | 0 | 0 | 0 | 1 | 1 | 1 | 0 | 0 | 0 | 1 | 1 | 1 | 0 | 0 | 0 | 1 | 1 | 1 |
| 22 | 7 | -1 | -1 | -1 | -1 | -1 | -1 | -1 | -1 | -1 | -1 | -1 | -1 | -1 | -1 | -1 | 1 | 1 | 1 | 0 | 0 | 0 | 1 | 1 | 1 | 0 | 0 | 0 | 1 | 1 | 1 | 0 | 0 | 0 | 1 | 1 | 1 |
| 23 | 8 | -1 | -1 | -1 | -1 | -1 | -1 | -1 | -1 | -1 | -1 | -1 | -1 | -1 | -1 | -1 | 0 | 1 | 1 | -1 | -1 | -1 | 1 | 1 | 1 | -1 | -1 | -1 | 1 | 1 | 1 | -1 | -1 | -1 | 1 | 1 | 1 |
| 24 | 8 | -1 | -1 | -1 | -1 | -1 | -1 | -1 | -1 | -1 | -1 | -1 | -1 | -1 | -1 | -1 | 0 | 1 | 1 | -1 | -1 | -1 | 1 | 1 | 1 | -1 | -1 | -1 | 1 | 1 | 1 | -1 | -1 | -1 | 1 | 1 | 1 |
| 25 | 7 | -1 | -1 | -1 | -1 | -1 | -1 | -1 | -1 | -1 | -1 | -1 | -1 | -1 | -1 | -1 | 1 | 1 | 1 | 0 | 0 | 0 | 1 | 1 | 1 | 0 | 0 | 0 | 1 | 1 | 1 | 0 | 0 | 0 | 1 | 1 | 1 |
| 26 | 8 | -1 | -1 | -1 | -1 | -1 | -1 | -1 | -1 | -1 | -1 | -1 | -1 | -1 | -1 | -1 | 0 | 1 | 1 | -1 | -1 | -1 | 1 | 1 | 1 | -1 | -1 | -1 | 1 | 1 | 1 | -1 | -1 | -1 | 1 | 1 | 1 |
| 27 | 9 | -1 | -1 | -1 | -1 | -1 | -1 | -1 | -1 | -1 | -1 | -1 | -1 | -1 | -1 | -1 | -1 | 0 | 1 | -1 | -1 | -1 | 0 | 1 | 1 | -1 | -1 | -1 | 0 | 1 | 1 | -1 | -1 | -1 | 0 | 1 | 1 |
| 28 | 9 | -1 | -1 | -1 | -1 | -1 | -1 | -1 | -1 | -1 | -1 | -1 | -1 | -1 | -1 | -1 | -1 | 0 | 1 | -1 | -1 | -1 | 0 | 1 | 1 | -1 | -1 | -1 | 0 | 1 | 1 | -1 | -1 | -1 | 0 | 1 | 1 |
| 29 | 10 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | 0 | 1 | -1 | -1 | -1 | -1 | 0 | 1 | -1 | -1 | -1 | -1 | 0 | 1 |
| 30 | 10 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | 0 | 1 | -1 | -1 | -1 | -1 | 0 | 1 | -1 | -1 | -1 | -1 | 0 | 1 |
| 31 | 8 | -1 | -1 | -1 | -1 | -1 | -1 | -1 | -1 | -1 | -1 | -1 | -1 | -1 | -1 | -1 | 0 | 1 | 1 | -1 | -1 | -1 | 1 | 1 | 1 | -1 | -1 | -1 | 1 | 1 | 1 | -1 | -1 | -1 | 1 | 1 | 1 |
| 32 | 9 | -1 | -1 | -1 | -1 | -1 | -1 | -1 | -1 | -1 | -1 | -1 | -1 | -1 | -1 | -1 | -1 | 0 | 1 | -1 | -1 | -1 | 0 | 1 | 1 | -1 | -1 | -1 | 0 | 1 | 1 | -1 | -1 | -1 | 0 | 1 | 1 |
| 33 | 10 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | 0 | 1 | -1 | -1 | -1 | -1 | 0 | 1 | -1 | -1 | -1 | -1 | 0 | 1 |
| 34 | 10 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | 0 | 1 | -1 | -1 | -1 | -1 | 0 | 1 | -1 | -1 | -1 | -1 | 0 | 1 |
| 35 | 11 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 0 | -1 | -1 | -1 | -1 | -1 | 0 |
| 36 | 11 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 0 | -1 | -1 | -1 | -1 | -1 | 0 |

| | Totals of All Outcomes | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|---|
| Total Blue Wins (-1 Totals): | 576 | = Sum: | 36 | 36 | 36 | 31 | 25 | 18 | 36 | 36 | 36 | 31 | 25 | 18 | 18 | 18 | 18 | 9 | 6 | 2 | 13 | 13 | 13 | 6 | 2 | 0 | 13 | 13 | 13 | 6 | 2 | 0 | 13 | 13 | 13 | 6 | 2 | 0 |
| Total Amber Wins (+1 Totals): | 584 | = Sum: | 0 | 0 | 0 | 2 | 5 | 11 | 0 | 0 | 0 | 2 | 5 | 11 | 11 | 11 | 11 | 23 | 27 | 30 | 18 | 18 | 18 | 27 | 30 | 34 | 18 | 18 | 18 | 27 | 30 | 34 | 18 | 18 | 18 | 27 | 30 | 34 |
| Total Blue and Amber Tie (0 Totals): | 136 | = Sum: | 0 | 0 | 0 | 3 | 6 | 7 | 0 | 0 | 0 | 3 | 6 | 7 | 7 | 7 | 7 | 4 | 3 | 4 | 5 | 5 | 5 | 3 | 4 | 2 | 5 | 5 | 5 | 3 | 4 | 2 | 5 | 5 | 5 | 3 | 4 | 2 |
| Check -- Total of All Outcomes (= 36 x 36): | 1,296 | | | | | | | | | | | | | | | | | | | | | | | | | | | | | | | | | | | | | |

44.4444% = Probability that Blue Wins the Roll
45.0617% = Probability that Amber Wins the Roll
10.4938% = Probability that Blue and Amber Tie on the Roll
0.6173% = The Edge Amber has over Blue

Fig. 17

Table 920 - Gaming Elements 910

All Single-Roll Probabilities for Red Pair 912 (a,b) vs. Blue Pair 914 (a,b)

Blue Pair 914 Pips: Blue 914a: 1 1 3 3 4 4 — Blue 914b: 1 1 5 5 6 6

In the Table Below, -1 Means that Blue Loses to Red
In the Table Below, +1 Means that Red Loses to Blue
In the Table Below, 0 Means that Red & Blue Tie

| Red Pair 912 Pips 912a | 912b | 36 Red Possibilities | Red Total | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|---|---|
| | | | Blue Total: | 2 | 2 | 4 | 4 | 5 | 5 | 2 | 2 | 4 | 4 | 5 | 5 | 6 | 6 | 8 | 8 | 9 | 9 | 6 | 6 | 8 | 8 | 9 | 9 | 7 | 7 | 9 | 9 | 10 | 10 | 7 | 7 | 9 | 9 | 10 | 10 |
| 1 | 2 | 1 | 3 | -1 | -1 | 1 | 1 | 1 | 1 | -1 | -1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | 2 | 2 | 3 | -1 | -1 | 1 | 1 | 1 | 1 | -1 | -1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | 3 | 3 | 4 | -1 | -1 | 0 | 0 | 1 | 1 | -1 | -1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | 3 | 4 | 4 | -1 | -1 | 0 | 0 | 1 | 1 | -1 | -1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 5 | 5 | 5 | 6 | -1 | -1 | -1 | -1 | -1 | -1 | -1 | -1 | -1 | -1 | -1 | -1 | 0 | 0 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| 6 | 5 | 6 | 6 | -1 | -1 | -1 | -1 | -1 | -1 | -1 | -1 | -1 | -1 | -1 | -1 | 0 | 0 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| | | 7 | 5 | -1 | -1 | -1 | -1 | 0 | 0 | -1 | -1 | -1 | -1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 8 | 5 | -1 | -1 | -1 | -1 | 0 | 0 | -1 | -1 | -1 | -1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 9 | 6 | -1 | -1 | -1 | -1 | -1 | -1 | -1 | -1 | -1 | -1 | -1 | -1 | 0 | 0 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| | | 10 | 6 | -1 | -1 | -1 | -1 | -1 | -1 | -1 | -1 | -1 | -1 | -1 | -1 | 0 | 0 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| | | 11 | 8 | -1 | -1 | -1 | -1 | -1 | -1 | -1 | -1 | -1 | -1 | -1 | -1 | -1 | -1 | 0 | 0 | 1 | 1 | -1 | -1 | 0 | 0 | 1 | 1 | -1 | -1 | 1 | 1 | 1 | 1 | -1 | -1 | 1 | 1 | 1 | 1 |
| | | 12 | 8 | -1 | -1 | -1 | -1 | -1 | -1 | -1 | -1 | -1 | -1 | -1 | -1 | -1 | -1 | 0 | 0 | 1 | 1 | -1 | -1 | 0 | 0 | 1 | 1 | -1 | -1 | 1 | 1 | 1 | 1 | -1 | -1 | 1 | 1 | 1 | 1 |
| | | 13 | 5 | -1 | -1 | -1 | -1 | 0 | 0 | -1 | -1 | -1 | -1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 14 | 5 | -1 | -1 | -1 | -1 | 0 | 0 | -1 | -1 | -1 | -1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 15 | 6 | -1 | -1 | -1 | -1 | -1 | -1 | -1 | -1 | -1 | -1 | -1 | -1 | 0 | 0 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| | | 16 | 6 | -1 | -1 | -1 | -1 | -1 | -1 | -1 | -1 | -1 | -1 | -1 | -1 | 0 | 0 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| | | 17 | 8 | -1 | -1 | -1 | -1 | -1 | -1 | -1 | -1 | -1 | -1 | -1 | -1 | -1 | -1 | 0 | 0 | 1 | 1 | -1 | -1 | 0 | 0 | 1 | 1 | -1 | -1 | 1 | 1 | 1 | 1 | -1 | -1 | 1 | 1 | 1 | 1 |
| | | 18 | 8 | -1 | -1 | -1 | -1 | -1 | -1 | -1 | -1 | -1 | -1 | -1 | -1 | -1 | -1 | 0 | 0 | 1 | 1 | -1 | -1 | 0 | 0 | 1 | 1 | -1 | -1 | 1 | 1 | 1 | 1 | -1 | -1 | 1 | 1 | 1 | 1 |
| | | 19 | 5 | -1 | -1 | -1 | -1 | 0 | 0 | -1 | -1 | -1 | -1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 20 | 5 | -1 | -1 | -1 | -1 | 0 | 0 | -1 | -1 | -1 | -1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 21 | 6 | -1 | -1 | -1 | -1 | -1 | -1 | -1 | -1 | -1 | -1 | -1 | -1 | 0 | 0 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| | | 22 | 6 | -1 | -1 | -1 | -1 | -1 | -1 | -1 | -1 | -1 | -1 | -1 | -1 | 0 | 0 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| | | 23 | 8 | -1 | -1 | -1 | -1 | -1 | -1 | -1 | -1 | -1 | -1 | -1 | -1 | -1 | -1 | 0 | 0 | 1 | 1 | -1 | -1 | 0 | 0 | 1 | 1 | -1 | -1 | 1 | 1 | 1 | 1 | -1 | -1 | 1 | 1 | 1 | 1 |
| | | 24 | 8 | -1 | -1 | -1 | -1 | -1 | -1 | -1 | -1 | -1 | -1 | -1 | -1 | -1 | -1 | 0 | 0 | 1 | 1 | -1 | -1 | 0 | 0 | 1 | 1 | -1 | -1 | 1 | 1 | 1 | 1 | -1 | -1 | 1 | 1 | 1 | 1 |
| | | 25 | 7 | -1 | -1 | -1 | -1 | -1 | -1 | -1 | -1 | -1 | -1 | -1 | -1 | -1 | -1 | 1 | 1 | 1 | 1 | -1 | -1 | 1 | 1 | 1 | 1 | 0 | 0 | 1 | 1 | 1 | 1 | 0 | 0 | 1 | 1 | 1 | 1 |
| | | 26 | 7 | -1 | -1 | -1 | -1 | -1 | -1 | -1 | -1 | -1 | -1 | -1 | -1 | -1 | -1 | 1 | 1 | 1 | 1 | -1 | -1 | 1 | 1 | 1 | 1 | 0 | 0 | 1 | 1 | 1 | 1 | 0 | 0 | 1 | 1 | 1 | 1 |
| | | 27 | 8 | -1 | -1 | -1 | -1 | -1 | -1 | -1 | -1 | -1 | -1 | -1 | -1 | -1 | -1 | 0 | 0 | 1 | 1 | -1 | -1 | 0 | 0 | 1 | 1 | -1 | -1 | 1 | 1 | 1 | 1 | -1 | -1 | 1 | 1 | 1 | 1 |
| | | 28 | 8 | -1 | -1 | -1 | -1 | -1 | -1 | -1 | -1 | -1 | -1 | -1 | -1 | -1 | -1 | 0 | 0 | 1 | 1 | -1 | -1 | 0 | 0 | 1 | 1 | -1 | -1 | 1 | 1 | 1 | 1 | -1 | -1 | 1 | 1 | 1 | 1 |
| | | 29 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 0 | 0 |
| | | 30 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 0 | 0 |
| | | 31 | 8 | -1 | -1 | -1 | -1 | -1 | -1 | -1 | -1 | -1 | -1 | -1 | -1 | -1 | -1 | 0 | 0 | 1 | 1 | -1 | -1 | 0 | 0 | 1 | 1 | -1 | -1 | 1 | 1 | 1 | 1 | -1 | -1 | 1 | 1 | 1 | 1 |
| | | 32 | 8 | -1 | -1 | -1 | -1 | -1 | -1 | -1 | -1 | -1 | -1 | -1 | -1 | -1 | -1 | 0 | 0 | 1 | 1 | -1 | -1 | 0 | 0 | 1 | 1 | -1 | -1 | 1 | 1 | 1 | 1 | -1 | -1 | 1 | 1 | 1 | 1 |
| | | 33 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 0 | 0 | -1 | -1 | 0 | 0 | 1 | 1 | -1 | -1 | 0 | 0 | 1 | 1 |
| | | 34 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 0 | 0 | -1 | -1 | 0 | 0 | 1 | 1 | -1 | -1 | 0 | 0 | 1 | 1 |
| | | 35 | 11 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |
| | | 36 | 11 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |

Totals of All Outcomes

| | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|
| Total Red Wins ( -1 ): | 576 = Sum: { | 36 | 36 | 32 | 32 | 26 | 26 | 36 | 36 | 32 | 32 | 26 | 26 | 18 | 18 | 6 | 6 | 4 | 4 | 18 | 18 | 6 | 6 | 4 | 4 | 16 | 16 | 4 | 4 | 2 | 2 | 16 | 16 | 4 | 4 | 2 | 2 } |
| Total Blue Wins ( +1 ): | 584 = Sum: { | 0 | 0 | 2 | 2 | 4 | 4 | 0 | 0 | 2 | 2 | 4 | 4 | 10 | 10 | 20 | 20 | 30 | 30 | 10 | 10 | 20 | 20 | 30 | 30 | 18 | 18 | 30 | 30 | 32 | 32 | 18 | 18 | 30 | 30 | 32 | 32 } |
| Total Red and Blue Tie ( 0 ): | 136 = Sum: { | 0 | 0 | 2 | 2 | 6 | 6 | 0 | 0 | 2 | 2 | 6 | 6 | 8 | 8 | 10 | 10 | 2 | 2 | 8 | 8 | 10 | 10 | 2 | 2 | 2 | 2 | 2 | 2 | 2 | 2 | 2 | 2 | 2 | 2 | 2 | 2 } |
| Check Total All Outcomes (= 36 x 36) | 1296 | | | | | | | | | | | | | | | | | | | | | | | | | | | | | | | | | | | | |

44.4444% = Probability that Red Wins 1 Roll
45.0617% = Probability that Blue Wins 1 Roll
10.4938% = Probability that Red and Blue Tie on 1 Roll
0.6173% = The Edge Blue has over Red

Fig. 21

Table 922 - Gaming Elements 910

Amber Dice Pair 916 (a,b) vs. Red Dice Pair 912 (a,b) -- All Possible Single-Roll Outcomes Red Pair 912 Pips: Red 912a: 1 3 3 3 5 6 / Red 912b: 2 2 3 3 5 5

In the Table Below, -1 Entry Means Red Loses to Amber for that Table Entry
In the Table Below, +1 Entry Means Amber Loses to Red for that Table Entry
In the Table Below, 0 Means that Red ties Amber for that Table Entry Amber Pair 916 Pips; 36 Red Possibilities:

| 916a | 916b | 36 Amber Possibilities | Amber Total | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|---|---|
| | | | Red Total: | 3 | 5 | 5 | 5 | 7 | 8 | 3 | 5 | 5 | 5 | 7 | 8 | 4 | 6 | 6 | 6 | 8 | 9 | 4 | 6 | 6 | 6 | 8 | 9 | 6 | 8 | 8 | 8 | 10 | 11 | 6 | 8 | 8 | 8 | 10 | 11 |
| 1 | 1 | 1 | 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 2 | 2 | 3 | 0 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | 3 | 3 | 4 | -1 | 1 | 1 | 1 | 1 | 1 | -1 | 1 | 1 | 1 | 1 | 1 | 0 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 |
| 3 | 4 | 4 | 5 | -1 | 0 | 0 | 0 | 1 | 1 | -1 | 0 | 0 | 0 | 1 | 1 | -1 | 1 | 1 | 1 | 1 | 1 | -1 | 1 | 1 | 1 | 1 | 1 | 1 | 1 | 1 | 1 | 1 | 1 | 1 | 1 | 1 | 1 | 1 | 1 |
| 6 | 5 | 5 | 6 | -1 | -1 | -1 | -1 | 1 | 1 | -1 | -1 | -1 | -1 | 1 | 1 | -1 | 0 | 0 | 0 | 1 | 1 | -1 | 0 | 0 | 0 | 1 | 1 | 0 | 1 | 1 | 1 | 1 | 1 | 0 | 1 | 1 | 1 | 1 | 1 |
| 6 | 6 | 6 | 7 | -1 | -1 | -1 | -1 | 0 | 1 | -1 | -1 | -1 | -1 | 0 | 1 | -1 | -1 | -1 | -1 | 1 | 1 | -1 | -1 | -1 | -1 | 1 | 1 | -1 | 1 | 1 | 1 | 1 | 1 | -1 | 1 | 1 | 1 | 1 | 1 |
| | | 7 | 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 8 | 3 | 0 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 9 | 4 | -1 | 1 | 1 | 1 | 1 | 1 | -1 | 1 | 1 | 1 | 1 | 1 | 0 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 |
| | | 10 | 5 | -1 | 0 | 0 | 0 | 1 | 1 | -1 | 0 | 0 | 0 | 1 | 1 | -1 | 1 | 1 | 1 | 1 | 1 | -1 | 1 | 1 | 1 | 1 | 1 | 1 | 1 | 1 | 1 | 1 | 1 | 1 | 1 | 1 | 1 | 1 | 1 |
| | | 11 | 6 | -1 | -1 | -1 | -1 | 1 | 1 | -1 | -1 | -1 | -1 | 1 | 1 | -1 | 0 | 0 | 0 | 1 | 1 | -1 | 0 | 0 | 0 | 1 | 1 | 0 | 1 | 1 | 1 | 1 | 1 | 0 | 1 | 1 | 1 | 1 | 1 |
| | | 12 | 7 | -1 | -1 | -1 | -1 | 0 | 1 | -1 | -1 | -1 | -1 | 0 | 1 | -1 | -1 | -1 | -1 | 1 | 1 | -1 | -1 | -1 | -1 | 1 | 1 | -1 | 1 | 1 | 1 | 1 | 1 | -1 | 1 | 1 | 1 | 1 | 1 |
| | | 13 | 4 | -1 | 1 | 1 | 1 | 1 | 1 | -1 | 1 | 1 | 1 | 1 | 1 | 0 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 |
| | | 14 | 5 | -1 | 0 | 0 | 0 | 1 | 1 | -1 | 0 | 0 | 0 | 1 | 1 | -1 | 1 | 1 | 1 | 1 | 1 | -1 | 1 | 1 | 1 | 1 | 1 | 1 | 1 | 1 | 1 | 1 | 1 | 1 | 1 | 1 | 1 | 1 | 1 |
| | | 15 | 6 | -1 | -1 | -1 | -1 | 1 | 1 | -1 | -1 | -1 | -1 | 1 | 1 | -1 | 0 | 0 | 0 | 1 | 1 | -1 | 0 | 0 | 0 | 1 | 1 | 0 | 1 | 1 | 1 | 1 | 1 | 0 | 1 | 1 | 1 | 1 | 1 |
| | | 16 | 7 | -1 | -1 | -1 | -1 | 0 | 1 | -1 | -1 | -1 | -1 | 0 | 1 | -1 | -1 | -1 | -1 | 1 | 1 | -1 | -1 | -1 | -1 | 1 | 1 | -1 | 1 | 1 | 1 | 1 | 1 | -1 | 1 | 1 | 1 | 1 | 1 |
| | | 17 | 8 | -1 | -1 | -1 | -1 | -1 | 0 | -1 | -1 | -1 | -1 | -1 | 0 | -1 | -1 | -1 | -1 | 0 | 1 | -1 | -1 | -1 | -1 | 0 | 1 | -1 | 0 | 0 | 0 | 1 | 1 | -1 | 0 | 0 | 0 | 1 | 1 |
| | | 18 | 9 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 0 | -1 | -1 | -1 | -1 | 1 | 1 | -1 | -1 | -1 | -1 | 1 | 1 |
| | | 19 | 4 | -1 | 1 | 1 | 1 | 1 | 1 | -1 | 1 | 1 | 1 | 1 | 1 | 0 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 |
| | | 20 | 5 | -1 | 0 | 0 | 0 | 1 | 1 | -1 | 0 | 0 | 0 | 1 | 1 | -1 | 1 | 1 | 1 | 1 | 1 | -1 | 1 | 1 | 1 | 1 | 1 | 1 | 1 | 1 | 1 | 1 | 1 | 1 | 1 | 1 | 1 | 1 | 1 |
| | | 21 | 6 | -1 | -1 | -1 | -1 | 1 | 1 | -1 | -1 | -1 | -1 | 1 | 1 | -1 | 0 | 0 | 0 | 1 | 1 | -1 | 0 | 0 | 0 | 1 | 1 | 0 | 1 | 1 | 1 | 1 | 1 | 0 | 1 | 1 | 1 | 1 | 1 |
| | | 22 | 7 | -1 | -1 | -1 | -1 | 0 | 1 | -1 | -1 | -1 | -1 | 0 | 1 | -1 | -1 | -1 | -1 | 1 | 1 | -1 | -1 | -1 | -1 | 1 | 1 | -1 | 1 | 1 | 1 | 1 | 1 | -1 | 1 | 1 | 1 | 1 | 1 |
| | | 23 | 8 | -1 | -1 | -1 | -1 | -1 | 0 | -1 | -1 | -1 | -1 | -1 | 0 | -1 | -1 | -1 | -1 | 0 | 1 | -1 | -1 | -1 | -1 | 0 | 1 | -1 | 0 | 0 | 0 | 1 | 1 | -1 | 0 | 0 | 0 | 1 | 1 |
| | | 24 | 9 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 0 | -1 | -1 | -1 | -1 | 1 | 1 | -1 | -1 | -1 | -1 | 1 | 1 |
| | | 25 | 7 | -1 | -1 | -1 | -1 | 0 | 1 | -1 | -1 | -1 | -1 | 0 | 1 | -1 | -1 | -1 | -1 | 1 | 1 | -1 | -1 | -1 | -1 | 1 | 1 | -1 | 1 | 1 | 1 | 1 | 1 | -1 | 1 | 1 | 1 | 1 | 1 |
| | | 26 | 8 | -1 | -1 | -1 | -1 | -1 | 0 | -1 | -1 | -1 | -1 | -1 | 0 | -1 | -1 | -1 | -1 | 0 | 1 | -1 | -1 | -1 | -1 | 0 | 1 | -1 | 0 | 0 | 0 | 1 | 1 | -1 | 0 | 0 | 0 | 1 | 1 |
| | | 27 | 9 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 0 | -1 | -1 | -1 | -1 | 1 | 1 | -1 | -1 | -1 | -1 | 1 | 1 |
| | | 28 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 1 | -1 | -1 | -1 | -1 | 0 | 1 |
| | | 29 | 11 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 0 |
| | | 30 | 12 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |
| | | 31 | 7 | -1 | -1 | -1 | -1 | 0 | 1 | -1 | -1 | -1 | -1 | 0 | 1 | -1 | -1 | -1 | -1 | 1 | 1 | -1 | -1 | -1 | -1 | 1 | 1 | -1 | 1 | 1 | 1 | 1 | 1 | -1 | 1 | 1 | 1 | 1 | 1 |
| | | 32 | 8 | -1 | -1 | -1 | -1 | -1 | 0 | -1 | -1 | -1 | -1 | -1 | 0 | -1 | -1 | -1 | -1 | 0 | 1 | -1 | -1 | -1 | -1 | 0 | 1 | -1 | 0 | 0 | 0 | 1 | 1 | -1 | 0 | 0 | 0 | 1 | 1 |
| | | 33 | 9 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 0 | -1 | -1 | -1 | -1 | 1 | 1 | -1 | -1 | -1 | -1 | 1 | 1 |
| | | 34 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 1 | -1 | -1 | -1 | -1 | 0 | 1 |
| | | 35 | 11 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | -1 | -1 | -1 | -1 | -1 | 0 |
| | | 36 | 12 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |

| | Totals of All Outcomes | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|---|
| Total Amber Wins ( -1 ) = | 576 | = Sum: ( | 32 | 24 | 24 | 24 | 14 | 10 | 32 | 24 | 24 | 24 | 14 | 10 | 28 | 20 | 20 | 20 | 10 | 6 | 28 | 20 | 20 | 20 | 10 | 6 | 20 | 10 | 10 | 10 | 4 | 2 | 20 | 10 | 10 | 10 | 4 | 2 ) |
| Total Red Wins ( +1 ) = | 584 | = Sum: ( | 2 | 8 | 8 | 8 | 16 | 22 | 2 | 8 | 8 | 8 | 16 | 22 | 4 | 12 | 12 | 12 | 22 | 26 | 4 | 12 | 12 | 12 | 22 | 26 | 12 | 22 | 22 | 22 | 30 | 32 | 12 | 22 | 22 | 22 | 30 | 32 ) |
| Total Amber and Red Ties ( 0 ) = | 136 | = Sum: ( | 2 | 4 | 4 | 4 | 6 | 4 | 2 | 4 | 4 | 4 | 6 | 4 | 4 | 4 | 4 | 4 | 4 | 4 | 4 | 4 | 4 | 4 | 4 | 4 | 4 | 4 | 4 | 4 | 2 | 2 | 4 | 4 | 4 | 4 | 2 | 2 ) |
| Total All Possible Outcomes (= 36 x 36) | 1,296 | | | | | | | | | | | | | | | | | | | | | | | | | | | | | | | | | | | | | |

44.4444% = Probability that Amber Wins the Roll
45.0617% = Probability that Red Wins the Roll
10.4938% = Probability that Amber and Red Tie on the Roll
0.6173% = The Edge Red has over Amber

Fig. 22

Table 924 - Gaming Elements 910

Blue Dice Pair 914 (a,b) vs. Amber Dice Pair 916 (a,b) -- All Possible Single-Roll Outcomes Amber Pair 916 Pips: Amber 916a: 1 1 3 3 6 6
Amber 916b: 1 2 3 4 5 6

In the Table Below, -1 Entry Means Amber Loses to Blue for that Table Entry
In the Table Below, +1 Entry Means Blue Loses to Amber for that Table Entry
In the Table Below, 0 Means that Blue ties Amber for that Table Entry

| Blue Pair 914 Pips 914a | 914b | 36 Blue Possibilities | Blue Total | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|---|---|
| | | | Amber Total: | 2 | 2 | 4 | 4 | 7 | 7 | 3 | 3 | 5 | 5 | 8 | 8 | 4 | 4 | 6 | 6 | 9 | 9 | 5 | 5 | 7 | 7 | 10 | 10 | 6 | 6 | 8 | 8 | 11 | 11 | 7 | 7 | 9 | 9 | 12 | 12 |
| 1 | 1 | 1 | 2 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 2 | 2 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | 3 | 3 | 6 | -1 | -1 | -1 | -1 | 1 | 1 | -1 | -1 | -1 | -1 | 1 | 1 | -1 | -1 | 0 | 0 | 1 | 1 | -1 | -1 | 1 | 1 | 1 | 1 | 0 | 0 | 1 | 1 | 1 | 1 | 1 | 1 | 1 | 1 | 1 | 1 |
| 3 | 3 | 4 | 6 | -1 | -1 | -1 | -1 | 1 | 1 | -1 | -1 | -1 | -1 | 1 | 1 | -1 | -1 | 0 | 0 | 1 | 1 | -1 | -1 | 1 | 1 | 1 | 1 | 0 | 0 | 1 | 1 | 1 | 1 | 1 | 1 | 1 | 1 | 1 | 1 |
| 4 | 3 | 5 | 7 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 | -1 | -1 | 1 | 1 | 1 | 1 | 0 | 0 | 1 | 1 | 1 | 1 |
| 4 | 3 | 6 | 7 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 | -1 | -1 | 1 | 1 | 1 | 1 | 0 | 0 | 1 | 1 | 1 | 1 |
| | | 7 | 2 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 8 | 2 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 9 | 6 | -1 | -1 | -1 | -1 | 1 | 1 | -1 | -1 | -1 | -1 | 1 | 1 | -1 | -1 | 0 | 0 | 1 | 1 | -1 | -1 | 1 | 1 | 1 | 1 | 0 | 0 | 1 | 1 | 1 | 1 | 1 | 1 | 1 | 1 | 1 | 1 |
| | | 10 | 6 | -1 | -1 | -1 | -1 | 1 | 1 | -1 | -1 | -1 | -1 | 1 | 1 | -1 | -1 | 0 | 0 | 1 | 1 | -1 | -1 | 1 | 1 | 1 | 1 | 0 | 0 | 1 | 1 | 1 | 1 | 1 | 1 | 1 | 1 | 1 | 1 |
| | | 11 | 7 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 | -1 | -1 | 1 | 1 | 1 | 1 | 0 | 0 | 1 | 1 | 1 | 1 |
| | | 12 | 7 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 | -1 | -1 | 1 | 1 | 1 | 1 | 0 | 0 | 1 | 1 | 1 | 1 |
| | | 13 | 4 | -1 | -1 | 0 | 0 | 1 | 1 | -1 | -1 | 1 | 1 | 1 | 1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 14 | 4 | -1 | -1 | 0 | 0 | 1 | 1 | -1 | -1 | 1 | 1 | 1 | 1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 15 | 8 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 | -1 | -1 | 1 | 1 | 1 | 1 |
| | | 16 | 8 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 | -1 | -1 | 1 | 1 | 1 | 1 |
| | | 17 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 |
| | | 18 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 |
| | | 19 | 4 | -1 | -1 | 0 | 0 | 1 | 1 | -1 | -1 | 1 | 1 | 1 | 1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 20 | 4 | -1 | -1 | 0 | 0 | 1 | 1 | -1 | -1 | 1 | 1 | 1 | 1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | 21 | 8 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 | -1 | -1 | 1 | 1 | 1 | 1 |
| | | 22 | 8 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 | -1 | -1 | 1 | 1 | 1 | 1 |
| | | 23 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 |
| | | 24 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 |
| | | 25 | 5 | -1 | -1 | -1 | -1 | 1 | 1 | -1 | -1 | 0 | 0 | 1 | 1 | -1 | -1 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| | | 26 | 5 | -1 | -1 | -1 | -1 | 1 | 1 | -1 | -1 | 0 | 0 | 1 | 1 | -1 | -1 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| | | 27 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 |
| | | 28 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 |
| | | 29 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 |
| | | 30 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 |
| | | 31 | 5 | -1 | -1 | -1 | -1 | 1 | 1 | -1 | -1 | 0 | 0 | 1 | 1 | -1 | -1 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| | | 32 | 5 | -1 | -1 | -1 | -1 | 1 | 1 | -1 | -1 | 0 | 0 | 1 | 1 | -1 | -1 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |
| | | 33 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 |
| | | 34 | 9 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 | -1 | -1 | 0 | 0 | 1 | 1 |
| | | 35 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 |
| | | 36 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | -1 | -1 | -1 | -1 | 1 | 1 | -1 | -1 | -1 | -1 | 1 | 1 |

(Column heads 1–36: 36 Amber Possibilities)

Totals of All Outcomes

| | Total | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|
| Total Blue Wins ( -1 Totals ) = | 576 | = Sum: { | 32 | 32 | 28 | 28 | 16 | 16 | 32 | 32 | 24 | 24 | 12 | 12 | 28 | 28 | 20 | 20 | 4 | 4 | 24 | 24 | 16 | 16 | 0 | 0 | 20 | 20 | 12 | 12 | 0 | 0 | 16 | 16 | 4 | 4 | 0 | 0 } |
| Total Amber Wins ( +1 Totals ) = | 584 | = Sum: { | 0 | 0 | 4 | 4 | 16 | 16 | 4 | 4 | 8 | 8 | 20 | 20 | 4 | 4 | 12 | 12 | 24 | 24 | 8 | 8 | 16 | 16 | 32 | 32 | 12 | 12 | 20 | 20 | 36 | 36 | 16 | 16 | 24 | 24 | 36 | 36 } |
| Total Blue and Amber Ties ( 0 Totals ): | 136 | = Sum: { | 4 | 4 | 4 | 4 | 4 | 4 | 0 | 0 | 4 | 4 | 4 | 4 | 4 | 4 | 4 | 4 | 8 | 8 | 4 | 4 | 4 | 4 | 4 | 4 | 4 | 4 | 4 | 4 | 0 | 0 | 4 | 4 | 8 | 8 | 0 | 0 } |
| Total of All Outcomes (= 36 x 36) | 1,296 | | | | | | | | | | | | | | | | | | | | | | | | | | | | | | | | | | | | | | |

44.4444% = Probability that Blue Wins the Roll
45.0617% = Probability that Amber Wins the Roll
10.4938% = Probability that Blue and Amber Tie on the Roll
0.6173% = The Edge Amber has over Blue

Fig. 23

Table 1020 - Gaming Elements 1010

In the matrix below, a +1 entry Means that The Red Card Dealt Won for that Entry
In the matrix below, a -1 entry Means that The Blue Card Dealt Won for that Entry
In the matrix below, a 0 entry Means that The Blue Card and The Red Card Tied Red Card Deck 1012 Compositon Blue Card Deck 1014 Composition

| Red Card Number | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|
| Blue Card Number | Card Value | 2 | 2 | 3 | 3 | 4 | 4 | 4 | 4 | 4 | 4 | 5 | 5 | 5 | 5 | 5 | 5 | 5 | 5 | 6 | 6 | 7 | 7 | 7 | 7 | 7 | 7 | 7 | 7 | 7 | 7 | 8 | 8 | 9 | 9 | 10 | 10 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 4 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 5 | 3 | -1 | -1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 6 | 3 | -1 | -1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 7 | 3 | -1 | -1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 8 | 3 | -1 | -1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 9 | 4 | -1 | -1 | -1 | -1 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 10 | 4 | -1 | -1 | -1 | -1 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 11 | 4 | -1 | -1 | -1 | -1 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 12 | 4 | -1 | -1 | -1 | -1 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 13 | 5 | -1 | -1 | -1 | -1 | -1 | -1 | -1 | -1 | -1 | -1 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 |
| 14 | 5 | -1 | -1 | -1 | -1 | -1 | -1 | -1 | -1 | -1 | -1 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 |
| 15 | 5 | -1 | -1 | -1 | -1 | -1 | -1 | -1 | -1 | -1 | -1 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 |
| 16 | 5 | -1 | -1 | -1 | -1 | -1 | -1 | -1 | -1 | -1 | -1 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 |
| 17 | 6 | -1 | -1 | -1 | -1 | -1 | -1 | -1 | -1 | -1 | -1 | -1 | -1 | -1 | -1 | -1 | -1 | -1 | -1 | 0 | 0 | 1 | 1 | 1 | 1 | 1 | 1 | 1 | 1 | 1 | 1 | 1 | 1 | 1 | 1 | 1 | 1 |
| 18 | 6 | -1 | -1 | -1 | -1 | -1 | -1 | -1 | -1 | -1 | -1 | -1 | -1 | -1 | -1 | -1 | -1 | -1 | -1 | 0 | 0 | 1 | 1 | 1 | 1 | 1 | 1 | 1 | 1 | 1 | 1 | 1 | 1 | 1 | 1 | 1 | 1 |
| 19 | 6 | -1 | -1 | -1 | -1 | -1 | -1 | -1 | -1 | -1 | -1 | -1 | -1 | -1 | -1 | -1 | -1 | -1 | -1 | 0 | 0 | 1 | 1 | 1 | 1 | 1 | 1 | 1 | 1 | 1 | 1 | 1 | 1 | 1 | 1 | 1 | 1 |
| 20 | 6 | -1 | -1 | -1 | -1 | -1 | -1 | -1 | -1 | -1 | -1 | -1 | -1 | -1 | -1 | -1 | -1 | -1 | -1 | 0 | 0 | 1 | 1 | 1 | 1 | 1 | 1 | 1 | 1 | 1 | 1 | 1 | 1 | 1 | 1 | 1 | 1 |
| 21 | 7 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 0 | 0 | 0 | 0 | 0 | 0 | 1 | 1 | 1 | 1 | 1 | 1 |
| 22 | 7 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 0 | 0 | 0 | 0 | 0 | 0 | 1 | 1 | 1 | 1 | 1 | 1 |
| 23 | 7 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 0 | 0 | 0 | 0 | 0 | 0 | 1 | 1 | 1 | 1 | 1 | 1 |
| 24 | 7 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 0 | 0 | 0 | 0 | 0 | 0 | 1 | 1 | 1 | 1 | 1 | 1 |
| 25 | 8 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 | 1 | 1 |
| 26 | 8 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 | 1 | 1 |
| 27 | 8 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 | 1 | 1 |
| 28 | 8 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 | 1 | 1 |
| 29 | 8 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 | 1 | 1 |
| 30 | 8 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 | 1 | 1 |
| 31 | 8 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 | 1 | 1 |
| 32 | 8 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 | 1 | 1 |
| 33 | 9 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 |
| 34 | 9 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 |
| 35 | 9 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 |
| 36 | 9 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 |

| Totals | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|
| Blue Wins: | 584 | = sum{ | 32 | 32 | 28 | 28 | 24 | 24 | 24 | 24 | 24 | 24 | 20 | 20 | 20 | 20 | 20 | 20 | 20 | 20 | 16 | 16 | 12 | 12 | 12 | 12 | 12 | 12 | 12 | 12 | 12 | 12 | 4 | 4 | 0 | 0 | 0 | 0 } |
| Red Wins: | 576 | = sum{ | 4 | 4 | 4 | 4 | 8 | 8 | 8 | 8 | 8 | 8 | 12 | 12 | 12 | 12 | 12 | 12 | 12 | 12 | 16 | 16 | 20 | 20 | 20 | 20 | 20 | 20 | 20 | 20 | 20 | 20 | 24 | 24 | 32 | 32 | 36 | 36 } |
| Ties: | 136 | = sum{ | 0 | 0 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 8 | 8 | 4 | 4 | 0 | 0 } |
| | 1,296 | | | | | | | | | | | | | | | | | | | | | | | | | | | | | | | | | | | | | |

45.062% Blue Wins
44.444% Red Wins
10.494% Red and Blue Tie 0.6173% Edge of Blue Deck 1014 over Red Deck 1012

Fig. 24

Table 1022 - Gaming Elements 1010

In the matrix below, a +1 entry Means that The Blue Card Dealt Won for that Entry
In the matrix below, a -1 entry Means that The Amber Card Dealt Won for that Entry
In the matrix below, a 0 entry Means that The Amber Card and The Blue Card Tied Blue Card Deck 1014 Compositon Amber Card Deck 1016 Composition

| Amber Card Number \ Blue Card Number | Card Value | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|
| Card Value | | 1 | 1 | 1 | 1 | 3 | 3 | 3 | 3 | 4 | 4 | 4 | 4 | 5 | 5 | 5 | 5 | 6 | 6 | 6 | 6 | 7 | 7 | 7 | 7 | 8 | 8 | 8 | 8 | 8 | 8 | 8 | 8 | 9 | 9 | 9 | 9 |
| 1 | 1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | 2 | -1 | -1 | -1 | -1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 4 | 2 | -1 | -1 | -1 | -1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 5 | 3 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 6 | 3 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 7 | 3 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 8 | 3 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 9 | 4 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 10 | 4 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 11 | 4 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 12 | 4 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 13 | 5 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 14 | 5 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 15 | 5 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 16 | 5 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 17 | 6 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 |
| 18 | 6 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 |
| 19 | 6 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 |
| 20 | 6 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 |
| 21 | 6 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 |
| 22 | 6 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 |
| 23 | 7 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 |
| 24 | 7 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 |
| 25 | 7 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 |
| 26 | 7 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 |
| 27 | 8 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 0 | 0 | 0 | 0 | 1 | 1 | 1 | 1 |
| 28 | 8 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 0 | 0 | 0 | 0 | 1 | 1 | 1 | 1 |
| 29 | 8 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 0 | 0 | 0 | 0 | 1 | 1 | 1 | 1 |
| 30 | 8 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 0 | 0 | 0 | 0 | 1 | 1 | 1 | 1 |
| 31 | 9 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 |
| 32 | 9 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 |
| 33 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |
| 34 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |
| 35 | 11 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |
| 36 | 11 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 |
| **Totals:** Amber Wins: 584 | = sum{ | 34 | 34 | 34 | 34 | 28 | 28 | 28 | 28 | 24 | 24 | 24 | 24 | 20 | 20 | 20 | 20 | 14 | 14 | 14 | 14 | 10 | 10 | 10 | 10 | 6 | 6 | 6 | 6 | 6 | 6 | 6 | 6 | 4 | 4 | 4 | 4 } |
| Blue Wins: 576 | = sum{ | 0 | 0 | 0 | 0 | 4 | 4 | 4 | 4 | 8 | 8 | 8 | 8 | 12 | 12 | 12 | 12 | 16 | 16 | 16 | 16 | 22 | 22 | 22 | 22 | 26 | 26 | 26 | 26 | 26 | 26 | 26 | 26 | 30 | 30 | 30 | 30 } |
| Ties: 136 | = sum{ | 2 | 2 | 2 | 2 | 4 | 4 | 4 | 4 | 4 | 4 | 4 | 4 | 4 | 4 | 4 | 4 | 6 | 6 | 6 | 6 | 4 | 4 | 4 | 4 | 4 | 4 | 4 | 4 | 4 | 4 | 4 | 4 | 2 | 2 | 2 | 2 } |
| 1,296 | | | | | | | | | | | | | | | | | | | | | | | | | | | | | | | | | | | | | |

45.062% Amber Wins
44.444% Blue Wins
10.494% Amber and Blue Tie 0.6173% Edge of Amber Deck 1016 over Blue Deck 1014

Fig. 25

Table 1024 - Gaming Elements 1010

In the matrix below, a +1 entry Means that The Amber Card Dealt Won for that Entry
In the matrix below, a -1 entry Means that The Red Card Dealt Won for that Entry
In the matrix below, a 0 entry Means that The Amber Card and The Red Card Tied

Amber Card Deck 1016 Compositon

Red Card Deck 1012 Composition

| Red Card Number | Amber Card Number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|
| | Card Value | 1 | 1 | 2 | 2 | 3 | 3 | 3 | 3 | 4 | 4 | 4 | 4 | 5 | 5 | 5 | 5 | 6 | 6 | 6 | 6 | 6 | 6 | 7 | 7 | 7 | 7 | 8 | 8 | 8 | 8 | 9 | 9 | 10 | 10 | 11 | 11 |
| 1 | 2 | -1 | -1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 2 | -1 | -1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 3 | 3 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 4 | 3 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 5 | 4 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 6 | 4 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 7 | 4 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 8 | 4 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 9 | 4 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 10 | 4 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 11 | 5 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 12 | 5 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 13 | 5 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 14 | 5 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 15 | 5 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 16 | 5 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 17 | 5 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 18 | 5 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 19 | 6 | -1 | -1 | -1 | -1 | -1 | -1 | -1 | -1 | -1 | -1 | -1 | -1 | -1 | -1 | -1 | -1 | 0 | 0 | 0 | 0 | 0 | 0 | 1 | 1 | 1 | 1 | 1 | 1 | 1 | 1 | 1 | 1 | 1 | 1 | 1 | 1 |
| 20 | 6 | -1 | -1 | -1 | -1 | -1 | -1 | -1 | -1 | -1 | -1 | -1 | -1 | -1 | -1 | -1 | -1 | 0 | 0 | 0 | 0 | 0 | 0 | 1 | 1 | 1 | 1 | 1 | 1 | 1 | 1 | 1 | 1 | 1 | 1 | 1 | 1 |
| 21 | 7 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 |
| 22 | 7 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 |
| 23 | 7 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 |
| 24 | 7 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 |
| 25 | 7 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 |
| 26 | 7 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 |
| 27 | 7 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 |
| 28 | 7 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 |
| 29 | 7 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 |
| 30 | 7 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 | 1 | 1 | 1 | 1 |
| 31 | 8 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 |
| 32 | 8 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 0 | 0 | 1 | 1 | 1 | 1 | 1 | 1 |
| 33 | 9 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 | 1 | 1 |
| 34 | 9 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 | 1 | 1 |
| 35 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 |
| 36 | 10 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | -1 | 0 | 0 | 1 | 1 |

| Totals | | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|---|---|
| Red Wins: | 584 | = sum( | 36 | 36 | 34 | 34 | 32 | 32 | 32 | 32 | 26 | 26 | 26 | 26 | 18 | 18 | 18 | 18 | 16 | 16 | 16 | 16 | 16 | 16 | 6 | 6 | 6 | 6 | 4 | 4 | 4 | 4 | 2 | 2 | 0 | 0 | 0 | 0 ) |
| Amber Wins: | 576 | = sum( | 0 | 0 | 0 | 0 | 2 | 2 | 2 | 2 | 4 | 4 | 4 | 4 | 10 | 10 | 10 | 10 | 18 | 18 | 18 | 18 | 18 | 18 | 20 | 20 | 20 | 20 | 30 | 30 | 30 | 30 | 32 | 32 | 34 | 34 | 36 | 36 ) |
| Ties: | 136 | = sum( | 0 | 0 | 2 | 2 | 2 | 2 | 2 | 2 | 6 | 6 | 6 | 6 | 8 | 8 | 8 | 8 | 2 | 2 | 2 | 2 | 2 | 2 | 10 | 10 | 10 | 10 | 2 | 2 | 2 | 2 | 2 | 2 | 2 | 2 | 0 | 0 ) |
| | 1,296 | | | | | | | | | | | | | | | | | | | | | | | | | | | | | | | | | | | | | |

45.062% Red Wins
44.444% Amber Wins
10.494% Red and Amber Tie 0.6173% Edge of Red Deck 1012 over Amber Deck 1016

Fig. 26

NON-TRANSITIVE GAMING ELEMENTS AND GAMING METHODS

CROSS REFERENCE TO RELATED APPLICATIONS

This application is a continuation of U.S. patent application Ser. No. 10/917,717, filed Aug. 13, 2004, now U.S. Pat. No. 8,029,356, U.S. Provisional Patent Application No. 61/443,112, filed Feb. 15, 2001 and U.S. Provisional Patent Application No. 61/447,810, filed Mar. 1, 2011, the disclosures of which are incorporated herein by reference.

FIELD OF THE INVENTION

The invention generally relates to groups of gaming elements, such as pairs of dice, customized to exhibit a non-transitive relationship, and games therefor.

BACKGROUND

As gaming continues to enjoy widespread acceptance, casinos are increasingly in need of new games of chance to retain and attract patrons. While electronic gaming devices (e.g., slot machines) attract the most attention, many players prefer the skill requirements and personal interaction of live gaming. Thus, live gaming continues to be an integral component to the success of any casino.

SUMMARY

The invention generally relates to a plurality of gaming elements which are configured to generate random outcomes that exhibit non-transitive relationships among each other. These non-transitive relationships generally refer to the circular nature of the randomly generated outcomes among the gaming elements.

In some embodiments, non-transitive gaming elements of the invention are used in the provision or play of games including a first side and a second side, and in which wagers are received as to which of the two sides will achieve a higher or lower score or rank.

In some embodiments, a player selects a first gaming element and a dealer, representing the house or gaming establishment, selects a second gaming element, wherein the gaming elements exhibit a non-transitive relationship. In these embodiments, the non-transitive relationship of the gaming elements insures that no matter which gaming element the player selects, the dealer can always select another gaming element (from the remaining gaming elements) that will, on average, outscore or otherwise "beat" the player-selected gaming element. When the gaming elements are single dice cubes, "beat" simply means that one cube, on average, rolls a higher number than another cube. For ease in describing embodiments of the invention, it will be presumed that a higher number corresponds with a higher score, however, it should be readily apparent that the gaming element may be configured so that the lower number will "beat" the higher number, if it is decided that the lower number provides the better ultimate score. When the gaming elements are dice pairs, "beat" means that one pair rolls a higher combined pair total than another pair, on average.

Accordingly, a first embodiment of the present invention utilizes a group of three pairs of differently colored (e.g., red, blue and amber) non-transitive dice and a second embodiment utilizes three non-transitive decks of cards. Non-transitive simply means that there exists a circular, rather than a linear, relationship among the group of objects. So, there must be at least three objects in the group in order to have a non-transitive relationship among them. In gaming, the non-transitive "relationship" is either "beats" or "loses to". In other words, the group of three dice pairs is non-transitive if and only if each pair of dice in the group loses to one of the other pairs of dice in the group. That is, each pair of the non-transitive dice will be outscored, on average, by one and only one of the remaining two dice pairs, neglecting any ties. Accordingly, with a first embodiment of the present invention, a player first selects or designates which pair of non-transitive dice will be used for play against the bank/house. Then, the banker/dealer/house selects from the remaining two pairs of non-transitive dice. Since the dealer is educated regarding the non-transitive dice, he or she selects that particular pair of the remaining two non-transitive dice pairs, which he or she knows has the advantage over the player-selected non-transitive dice pair.

To facilitate the first embodiment of the present invention, a Blackjack type table layout depicts multiple wagering areas. The wagering areas include a player or banker/dealer wager (these two wagers are mutually exclusive), a push wager, a triple-player-win wager, a double-tie wager and a triple-tie wager. In the first embodiment, a "game" comprises three rolls of two pairs of the dice; a player rolls one pair and another pair is rolled by the banker/dealer. As used herein the terms "dealer" and "banker" are used synonymously. The two wagers on the player or banker/dealer are dependent upon whether the player or the banker/dealer will obtain a higher score on at least two out of the three rolls and so are obviously mutually exclusive. The winning player or banker/dealer wagers both pay 1 to 1 or even money. A push occurs when neither the player nor banker/dealer wins two of the three rolls. The push wager pays 5 to 1. The player and banker/dealer wagers both result in no play on a push outcome. That is, the player retains the original wager but does not win anything on the player or banker/dealer wager. However, in order to maintain a house edge on the banker/dealer wager, a banker/dealer wager will lose one half of their bet if the game results in a push outcome and there is one player win and one banker win and the player win occurs before the banker win. Clearly, this rule could alternatively require that the banker win occur before the player win and the offering casino can decide which rule to use. Other wagers include a double-tie wager, which pays 30 to 1, a triple-tie wager, which pays 750 to 1, and a triple-player-win wager, which pays 10 to 1. To track and record game play, the table layout also depicts player, banker and tie indicators for each of the three roll outcomes. Based on the above noted features, the embodiments of the present invention provide a very fast-paced game since there are no player decisions once the two non-transitive gaming elements in play are selected and wagers have been placed. The game has a house edge on the even-money wagers, which is comparable to baccarat and attractive to players and acceptable to the house or casino.

In order to make the game fast-paced, only one player seated at the table plays against the house during a game. All players seated at the table may place wagers on either "P" for player or "B" for the bank (as well as the other wagers discussed above). This is exactly the same betting style of Baccarat. Whether the player actually rolls the "player-dice" or only designates (by pointing to) the "player dice" container, which the dealer then subsequently rolls for the player, is not critical for the operation of the game. It is quite likely, however, that players will want to actively participate in the game by actually shaking the player-selected dice container.

Because casinos are extremely concerned about cheating, a dice game designed for play on a Blackjack-style table offers unique challenges for the casino. Most likely, casinos will require the dice to be "rolled" or shaken in either totally closed containers (e.g. Chuck-A-Luck cages) or in partially enclosed containers (e.g. dice cups). Dice cups that allow the dice to roll out on the table surface are not seen as a preferred method of rolling because of the security compromises such player access to the dice present. And while enclosed dice shakers or rolling devices already exist they tend to be quite expensive. Because the new non-transitive game requires three dice shakers, and since minimizing game cost to offering casinos is of great priority, one embodiment of the present invention uses proprietary, sealed, transparent low-cost dice shakers. Not only is the new dice shaker lower in cost than existing devices, it also "rolls" the dice in a more random manner.

Optionally, a non-transparent sleeve or cover, placed over the shaker during the shaking process, provides additional concealment of the dice "rolls" or "outcomes" within the shakers both during and after the shaking process. The purpose of the sleeve is to prevent last moment "adjustments" to the dice outcome (should the player observe a low numerical outcome) and thus should minimize disputes with the casino personnel. Nobody can possibly know the outcome of the "roll" until the sleeve is completely removed from the shaker to reveal the dice outcome. The sleeve is removed only after the dice and the dice shaker container are completely at rest upon the table surface The dice shakers prevent players and the banker/dealer from directly handling the dice. This method of "rolling" the dice also virtually eliminates any physical contamination of the dice with drinks, cigarette ashes, nicks from jewelry, or any other foreign object interaction. Furthermore, the risk or appearance of cheating is virtually eliminated. This method of rolling dice also increases the duty cycle of the dice, thereby reducing the cost to the casino for dice replacement as well as reducing the time casino personnel are required to spend to perform periodic dice inspections.

Some embodiments of the invention are directed to non-transitive gaming elements, which include a first one or more gaming elements configured for providing a first random outcome associated with a score; a second one or more gaming elements configured for providing a second random outcome associated with a score; a third one or more gaming elements configured for providing a third random outcome associated with a score, wherein the second one or more gaming elements provides an advantage represented by higher scores, on average, as compared with the first one or more gaming elements, the third one or more gaming elements provides an advantage represented by higher scores, on average, as compared with the second one or more gaming elements and the first one or more gaming elements provides an advantage represented by higher scores, on average, as compared with the third one or more gaming elements.

It should be understood that the score may be any indicia, ranking or value used for comparative purposes or indicating relative quality, such as a numerical value.

Some embodiments of the invention are directed to non-transitive gaming elements which include: a first one or more gaming elements configured for providing a first random outcome associated with a score; a second one or more gaming elements configured for providing a second random outcome associated with a score; a third one or more gaming elements configured for providing a third random outcome associated with a score, wherein the second one or more gaming elements provides an advantage represented by higher scores, on average, as compared with the scores of the first one or more gaming elements, the third one or more gaming elements provides an advantage represented by higher scores, on average, as compared with the scores of the second one or more gaming elements and the first one or more gaming elements provides an advantage represented by higher scores, on average, as compared with the scores of the third one or more gaming elements, and wherein each of the three respective advantages are all less than 3 percent and each advantage does not differ from the mean of the three advantages by more than 20 percent.

In some embodiments, the outcomes of the first, second and third gaming elements are each associated with a numerical value, and a higher numerical value may be equivalent to a higher score. The first, second and third random outcomes may each be associated with an integer.

In some embodiments, the first, second and third gaming elements are configured to provide three respective probabilities of achieving a tie score which are all greater than 10 percent and less than 12 percent. The gaming elements may be configured so that probabilities may be substantially the same among the first, second and third gaming elements, and each respective tie probability may not differ from the mean of the three tie probabilities by more than 5 percent. The gaming elements may also be configured so that the three respective advantages may not differ from their mean by more than 1 percent.

In some embodiments, the gaming elements of the aforementioned non-transitive gaming elements are two dice or more for each gaming element. In other embodiments, the first, second and third gaming elements are groups of specially configured decks of non-transitive cards. For example, the first non-transitive group of cards may comprise 36 cards of the following configuration: two 2s, two 3s, six 4s, eight 5s, two 6s, ten 7s, two 8s, two 9s and two 10s; the second group of cards may comprise 36 cards of the following configuration: four 1s, four 3s, four 4s, four 5s, four 6s, four 7s, eight 8s and four 9s; and the third group of cards may comprise 36 cards of the following configuration: two 1s, two 2s, four 3s, four 4s, four 5s, six 6s, four 7s, four 8s, two 9s, two 10s and two 11s.

In some embodiments, the gaming elements are all the same, such as one or more dice for each, or decks of cards for each, whereas in other embodiments, the gaming elements differ, such as cards, one or more dice and a computer processor or other elements for generating random outcomes associated with a score.

In some embodiments, the first, second and third one or more gaming elements include features which render each of the first, second and third one or more gaming elements distinguishable from one another. The features may be one or more physical aspects, such as size, coloring, shape, indicia, etc.

Some embodiments of the invention are also directed to non-transitive gaming elements, which include: a first one or more dice configured for generating a first random roll outcome associated with a score; a second one or more dice configured for generating a second random roll outcome associated with a score; a third one or more dice configured for generating a third random roll outcome associated with a score, wherein the second one or more dice is further configured to provide a higher roll score at a statistical advantage of x as compared with the roll score of the first one or more dice, the third one or more dice is further configured to provides a higher roll score at a statistical advantage of y as compared with the roll score of the second one or more dice and the first one or more dice is further configured to provide a higher roll score at a statistical advantage of z as compared with the roll score of the third one or more dice, wherein x, y and z are each values that are greater than zero percent and less than 5 percent.

In some embodiments, the first one or more dice are a first color, the second one or more dice are a second color and third one or more dice are a third color, the first, second and third colors being different from one another. In some embodiments, the first, second and third one or more dice each include dice having six sides.

In some embodiments, the three respective probabilities of achieving a tie score among the first, second and third one or more dice does not differ from the mean of said three probabilities by more than 2 percent. In other embodiments, the three respective probabilities of achieving a tie score are identical among the first, second and third one or more dice. In some embodiments, the three respective non-transitive advantages (x, y and z) are the same among the first, second and third one or more dice.

In some embodiments the advantages are the same among the first, second and third one or more dice and probabilities of achieving a tie score are the same among the first, second and third one or more dice. One such embodiment comprises three pairs of non-transitive dice wherein the first pair of dice further comprises a first die with 1, 3, 3, 3, 5 and 6 pips, respectively on each side, and a second die with 2, 2, 3, 3, 5 and 5 pips, respectively on each side, and the second pair of dice further comprises a first die with 1, 1, 3, 3, 4 and 4 pips, respectively on each side, and a second die with 1, 1, 5, 5, 6 and 6 pips, respectively on each side and the third pair of dice further comprises a first die with 1, 1, 3, 3, 6 and 6 pips, respectively on each side, and a second die with 1, 2, 3, 4, 5 and 6 pips, respectively on each side. In this embodiment, all three advantages are identical and equal to 8/1296 and all three tie probabilities are also identical and equal to 136/1296.

Some embodiments of the invention are directed to gaming apparatus for producing non-transitive random outcomes, which includes: a first one or more gaming elements configured for providing a first randomly generated score; a second one or more gaming elements configured for providing a second randomly generated score; and a third one or more gaming elements configured for providing a third randomly generated score, wherein the first, second and third gaming elements are configured for the second score to be a higher score, on average, than the first score by an advantage between greater than zero percent and less than 5 percent, and the third score to be a higher score, on average, than the second score by an advantage between greater than zero percent and less than 5 percent, the first score to be a higher score, on average, than the third score by an advantage between greater than zero percent and less than 5 percent, with any pair of the first, second or third scores having a probability of greater than 5 percent and less than 15 percent of being a tie. In other words, the three probabilities of the first score and second score being a tie, first score and third score being a tie, and second score and third score being a tie, respectively, are all greater than 5 percent and less than 15 percent.

In some embodiments, the first, second and third gaming elements of the gaming apparatus are configured for the second score to be a higher score, on average, than the first score by an advantage A, the third score to be a higher score, on average, than the second score by the advantage A, and the first score to be a higher score, on average, than the third score by the advantage A, wherein A is a value greater than zero percent and less than 5 percent.

In some embodiments, the first, second and third gaming elements are configured to provide the same probability of any two of the first, second and third scores being a tie. In other words, the three probabilities of the first score and second score being a tie, first score and third score being a tie, and second score and third score being a tie, respectively, are all the same.

In some embodiments, the first, second and third scores are numerical values. In some embodiments, a higher score corresponds with a higher numerical value, whereas in other embodiments a higher score corresponds with a lower numerical value or other indicia. In some embodiments, a tie corresponds with same numerical value among any two scores.

In some embodiments, one, two or all of the first, second and third gaming elements associated with the gaming apparatus comprise a pair of six-sided dice. In other embodiments, one, two or all of the first, second and third gaming elements of the gaming apparatus comprise one or more data processors. In some embodiments, the gaming apparatus further includes a display for displaying the first, second and third scores. In some embodiments, the gaming apparatus is an electronic gaming machine for one or more players, or provided wirelessly to a mobile platform or personal computer via the Internet.

Other features, embodiments and variations will become evident from the following detailed description, drawings and claims.

BRIEF DESCRIPTION OF THE DRAWINGS

FIG. 2 shows a chart detailing indicia of each of three pair of non-transitive dice;

FIG. 2*a* shows the single-roll probabilities associated with the dice numbering scheme detailed in FIG. 2;

FIG. 2*b* shows a chart detailing the associated game probabilities for a three-roll dice game embodiment using the three dice pair of FIG. 2;

FIG. 2*c* shows a chart detailing a three non-transitive card deck embodiment and the associated probabilities for a three-deal card game;

FIG. 9 shows the detailed calculation of all of the probabilities for the red pair vs. the blue pair combination of non-transitive dice of FIGS. 6-8;

FIG. 10 shows the detailed calculation of all of the probabilities for the amber pair vs. the red pair combination of non-transitive dice of FIGS. 6-8;

FIG. 11 shows the detailed calculation of all of the probabilities for the blue pair vs. the amber pair combination of non-transitive dice of FIGS. 6-8;

FIG. 15 shows the detailed calculation of all of the probabilities for the blue pair vs. the amber pair combination of non-transitive dice of FIGS. 12-14;

FIG. 16 shows the detailed calculation of all of the probabilities for the amber pair vs. the red pair combination of non-transitive dice of FIGS. 12-14;

FIG. 17 shows the detailed calculation of all of the probabilities for the red pair vs. the blue pair combination of non-transitive dice of FIGS. 12-14;

FIG. 21 shows the detailed calculation of all of the probabilities for the red pair vs. the blue pair combination of non-transitive dice of FIGS. 18-20;

FIG. 22 shows the detailed calculation of all of the probabilities for the amber pair vs. the red pair combination of non-transitive dice of FIGS. 18-20;

FIG. 23 shows the detailed calculation of all of the probabilities for the blue pair vs. the amber pair combination of non-transitive dice of FIGS. 18-20;

FIG. 24 shows the detailed calculation of all of the probabilities for the red card deck vs. the blue card deck combination of non-transitive gaming elements;

FIG. 25 shows the detailed calculation of all of the probabilities for the blue card deck vs. the amber card deck combination of non-transitive gaming elements; and FIG. 26 shows the detailed calculation of all of the probabilities for the amber card deck vs. the red card deck combination of non-transitive gaming elements.

DETAILED DESCRIPTION

Figure 1:
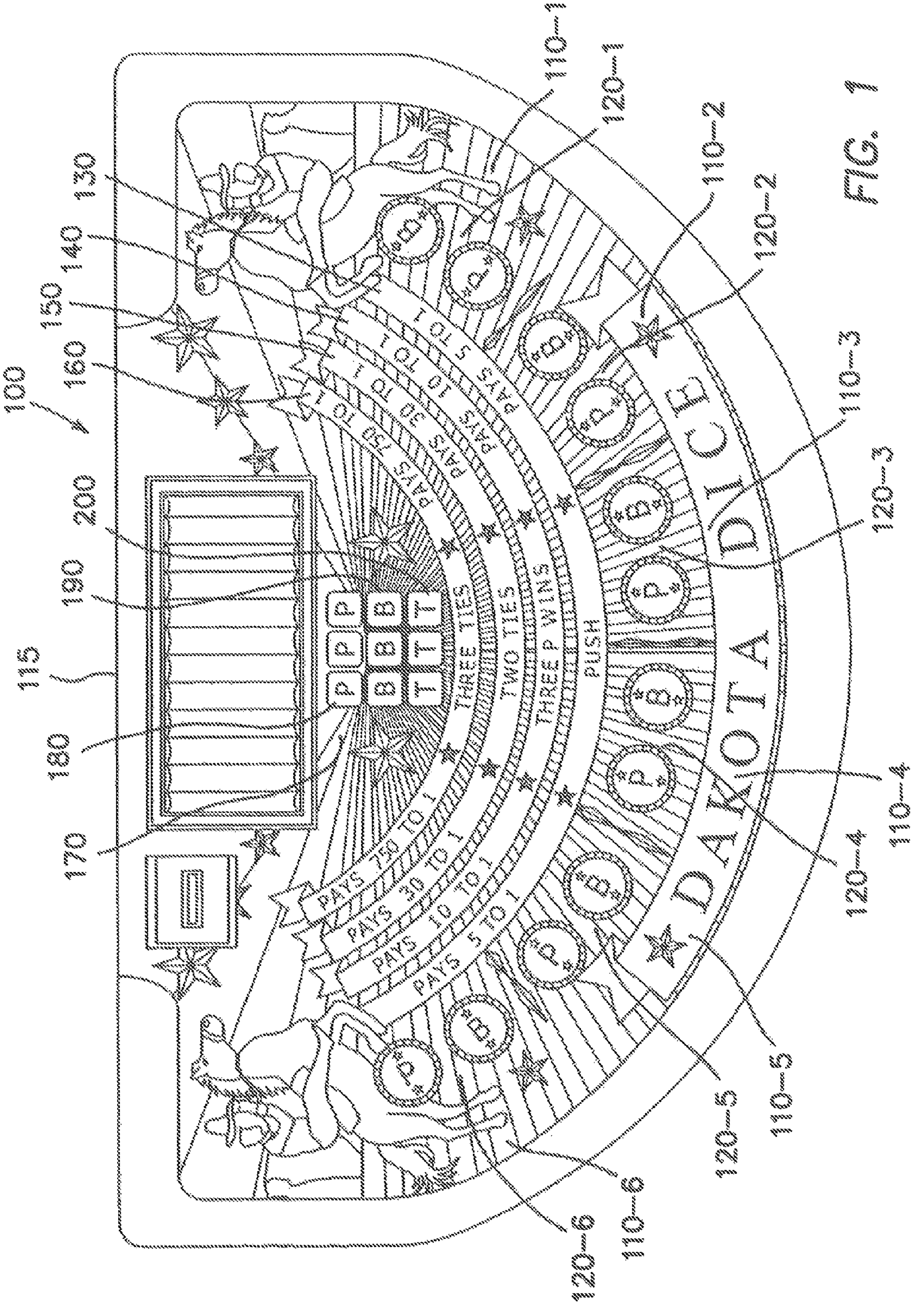
FIG. 1 shows a gaming table layout of a live embodiment of the present invention.

Reference is now made to the figures wherein like parts are referred to by like numerals throughout. FIG. 1 shows a gaming table layout generally referred to by reference numeral 100. The layout 100 accommodates six player positions 110-1 through 110-6 and a dealer position 115. The layout 100 depicts six player (P) and banker/dealer (B) wager areas 120-1 through 120-6, a push wager area 130, a triple-player-win wager area 140, a double tie wager area 150 and a triple tie wager area 160. The wager areas may also include associated payouts. To track play of the game, a series of result icons 170, namely a player (P) win 180, banker (B) win 190 or tie (T) 200, are depicted near a center of the layout 100. As described below, the result icons 170 permit the banker/dealer to temporarily record the results of three successive rolls of the game dice. It is conceivable that the results may be tracked using other means including an electronic display device similar to those used with conventional Roulette and Baccarat games.

A first embodiment of the present invention is facilitated by a group of six-sided non-transitive dice. In a first embodiment, the group comprises three pairs of non-transitive dice. The group comprises three uniquely colored pairs of dice (e.g., red, blue and amber). One example of the non-transitive numbering of the dice is illustrated in chart 300 of FIG. 2. Specifically, the dice numbering is such that, on average, the score outcomes of the red pair are beaten by the score outcomes of the blue pair, the score outcomes of the blue pair are beaten by the score outcomes of the amber pair and the score outcomes of the amber pair are beaten by the score outcomes of the red pair. Specific probabilities related to the non-transitive numbering of FIG. 2 are shown in the chart 310 of FIG. 2*a*. Those skilled in the art will understand that many other non-transitive numbering schemes are possible without departing from the spirit and scope of the present invention. For a three-roll game, the house advantages for all of the game wagers are shown chart 312 in FIG. 2*b*.

A second embodiment of the new non-transitive casino game employs three decks of specially constructed card decks. Exactly as in the three-dice-pair embodiment, there are three non-transitive objects, in this case, card decks: A, B and C. Arbitrarily, each card deck is constructed out of 75 cards but the three decks each have very different card compositions. The three card decks are constructed to have the non-transitive property so that, on average, a single card dealt from Deck B will beat a single card dealt from Deck A, and a single card dealt from Deck C will, on average, beat a single card dealt from Deck B. Similarly, on average, a single card dealt from Deck A will beat a single card dealt from Deck C. The exact deck compositions and the single card probabilities for but one example are shown in a top portion 315 of FIG. 2*c*. Like the dice embodiment, there are only eleven possible integer results that can appear as an outcome. With the dice, the lowest number on each cube is a 1 so in the pair total, the lowest number to occur is a 2. And the largest numerical outcome that a dice pair can total (using standard dice pips) is 12. So, there are only eleven distinct integer outcomes that can occur.

For the non-transitive three-card-deck embodiment, integers one through eleven inclusive, are used. One way to implement or distinguish the ones and elevens is to simply assign all red aces the value one and all black aces the value eleven. In this way, all three of the non-transitive three-deck embodiment can be constructed out of multiple, standard single card decks. Note, however, that Deck A consumes 5 standard card decks because it requires 19 sixes.

The lower portion 320 of FIG. 2*c* shows the house advantage for all of the wagers associated with the three-card-deck and three-card-deal embodiment of the new non-transitive casino game. The game and method of play is exactly the same game (whoever wins 2 out of 3 outcomes wins) as in the three-dice-pair embodiment. Accordingly, the dealer deals the player a single card from the player-selected deck and the dealer deals the house a single card from the dealer-selected deck. Thus, three successive card match-ups between the player and the dealer comprise a single game.

When comparing the three non-transitive card deck house advantage results with the three non-transitive dice pair results of FIG. 2*b*, it is apparent that there is considerably less fluctuation in the house advantages among the three non-transitive card combinations (B, A), (C, B) and (A, C). Of course, this should not be surprising since there are 75 independent and distinct elements (cards) to "play with" in constructing each of the three card decks. In the three-dice-pair embodiment there are only 6 elements, one for each face on each cube, which gives rise to 36 combinations, which are not independent.

Figure 3:
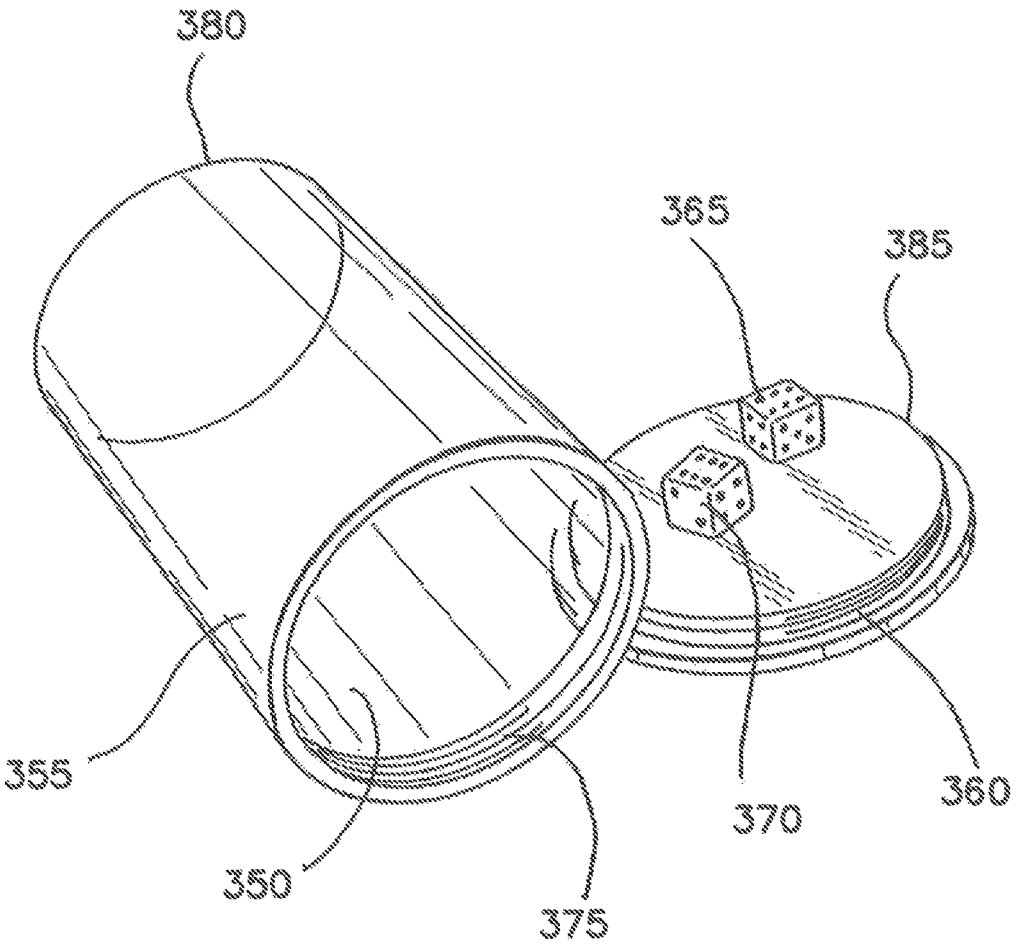
FIG. 3 shows a dice shaker for facilitating one or more of the embodiments of the present invention.

FIG. 3 shows a dice shaker 350 for facilitating the live table game embodiment of the present invention. The shaker 350 comprises a transparent cylindrical housing 355 having an open end. An end cap 360 acts to seal the dice 365 within the housing 355. Although the end cap 360 may be joined to the housing 355 in any number of ways, as shown in FIG. 3, the end cap 360 includes a threaded lip 370 for receipt by a threaded upper portion 375 of the housing 355. One key feature of the new dice shaker 350 is the rubber-like inserts used to cover both the fixed bottom 380 of the housing 355 and an underside 385 of the end cap 360 in which the rubber-like disk is recessed into the cap 360. The material used in the present embodiment of the shaker is EVA (ethylene vinyl acetate), a copolymer member of the polyolefin family derived from random copolymerization of vinyl acetate and ethylene resulting in a resin with similar properties to that of polyethylene but with greater flexibility and resistance to impact and elongation. Because of EVA's resiliency, the dice achieve very high velocities during the shaking process which virtually guarantees randomness in the outcomes when the dice come to rest on the shaker bottom. This soft material also prevents damage to the dice 365 and reduces the noise level associated with operation of the shaker 350.

Figure 4:
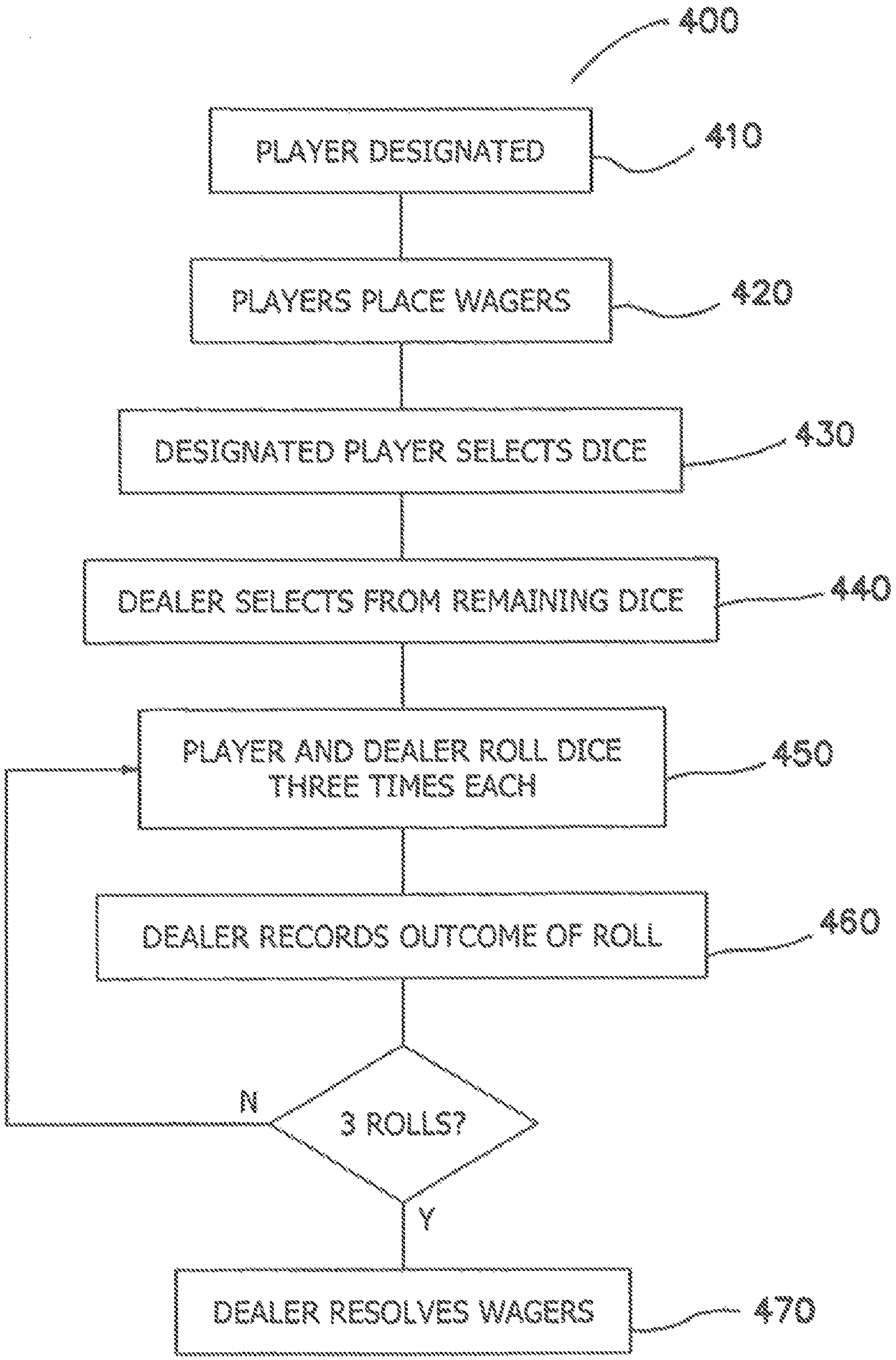
FIG. 4 shows a flow chart detailing one method of play of a live embodiment of the present invention.

FIG. 4 shows a flow chart 400 detailing a first method of play of a live embodiment of the present invention. At step 410, a player is designated as a player dice roller. The designated player acts as the proxy roller for all player bettors at the table. The casino offering the game will determine the number of games which any one designated player may roll. The casino may alternatively require that the dealer roll for the designated player, allowing the designated player to only select the dice that will be used for the player. If the casino permits the player to actually roll the dice, the player may be permitted to roll for only one game or a series of games. At step 420, players place wagers on either the player or the banker/dealer. Optionally, players may also place proposition wagers on the occurrence of a push, double tie, triple tie and/or three consecutive player wins. An allowable range of wager amounts is established by individual casinos. Steps 410 and 420 may be reversed without impacting the game. However, by designating the player before wagers are placed, the other players at the table are able to use past results of the designated player roller to determine whether to wager on the player or the banker/dealer. While the past results have no scientific relevance to the upcoming rolls, players tend to be superstitious and look for reasons to justify their wager. The various wagers have corresponding payouts as follows: TABLE-US-00001 Player or Banker/Dealer 1 to 1 Push 5 to 1 Triple-player-win 10 to 1 Double Tie 30 to 1 Triple Tie 750 to 1.

Next, at step 430, the designated player selects one pair of non-transitive dice from the three available pair of dice. It is noted that the player is able to select new dice after each game. In fact, depending on the casino offering the game, the player may be able to change dice during a game. In any event, ideally, the dice are contained in a transparent dice shaker as shown in FIG. 3. Then, at step 440, the banker/dealer specifically selects the one pair of remaining dice which, on average, has the advantage over the player-selected dice. That is, since the banker/dealer knows which pair of remaining dice has the advantage over the player-selected pair of dice, he or she is able to select the same. For example, assuming the dice hierarchy noted above, if the player selects the blue pair of dice, the banker/dealer must select the amber pair of dice. Once the dice pairs are selected, at step 450, the player and the banker/dealer utilize their respective shakers 350 to roll the contained dice 365. Ideally, the player and the banker/dealer roll the dice simultaneously. However, there is no reason that the banker/dealer cannot roll before the player or vice versa. Subsequent to the first roll, at step 460, the banker/dealer records the outcome of the first roll by placing a marker on one of the result icons 170. Consequently, the banker/dealer must place the marker on the player (P) win icon 180, banker (B) win icon 190 or tie (T) icon 200. Once three rolls have been completed and recorded, the banker/dealer resolves the player wagers at step 470.

The player or banker/dealer wagers are based on the scoring outcomes of the three rolls. More particularly, a player wager wins if the player outscores the dealer on at least two of the three rolls and the banker/dealer wager wins if the dealer outscores the player on at least two of three rolls. Winning player or banker/dealer wagers pay even money (i.e., 1 to 1). A push wager wins when neither the player nor the banker/dealer outscores the other on two of the three rolls. Specifically, a push occurs when the player wins one roll, the banker/dealer wins one roll and the other roll is a tie or when the player and banker/dealer tie on two or three rolls. A winning push wager pays 5 to 1. Since the non-transitive dice provide the house with the edge, there must be a mechanism for ensuring the player-placed banker/dealer wager favors the house. Thus, in every case except three, a push results in no action (i.e., the player retains his or her original wager) for the player and banker/dealer wagers. To create the house edge on the banker/dealer wager, any push outcome consisting of one of the following three roll sequences: PBT, PTB, and TPB, results in the banker/dealer bettor losing one half of their bet on the banker/dealer wager. Those skilled in the art will recognize that another sequence (e.g., BPT, BTP, and TBP) can be substituted for the above three banker/wager sequences.

Other proposition wagers include wagers on the player outscoring the banker/dealer each of the three consecutive rolls, two ties occurring during the three rolls and three ties occurring during the three rolls. The aforementioned wagers pay 10 to 1, 30 to 1 and 750 to 1, respectively. It is unusual to find a 750 to 1 payout on a live table game. Moreover, considering the number of games which can be played over the course of one day, the three ties outcome should occur about once per eight hour shift. Clearly, the wagers and corresponding payouts may be manipulated to the satisfaction of the casinos offering the game.

Figure 5:
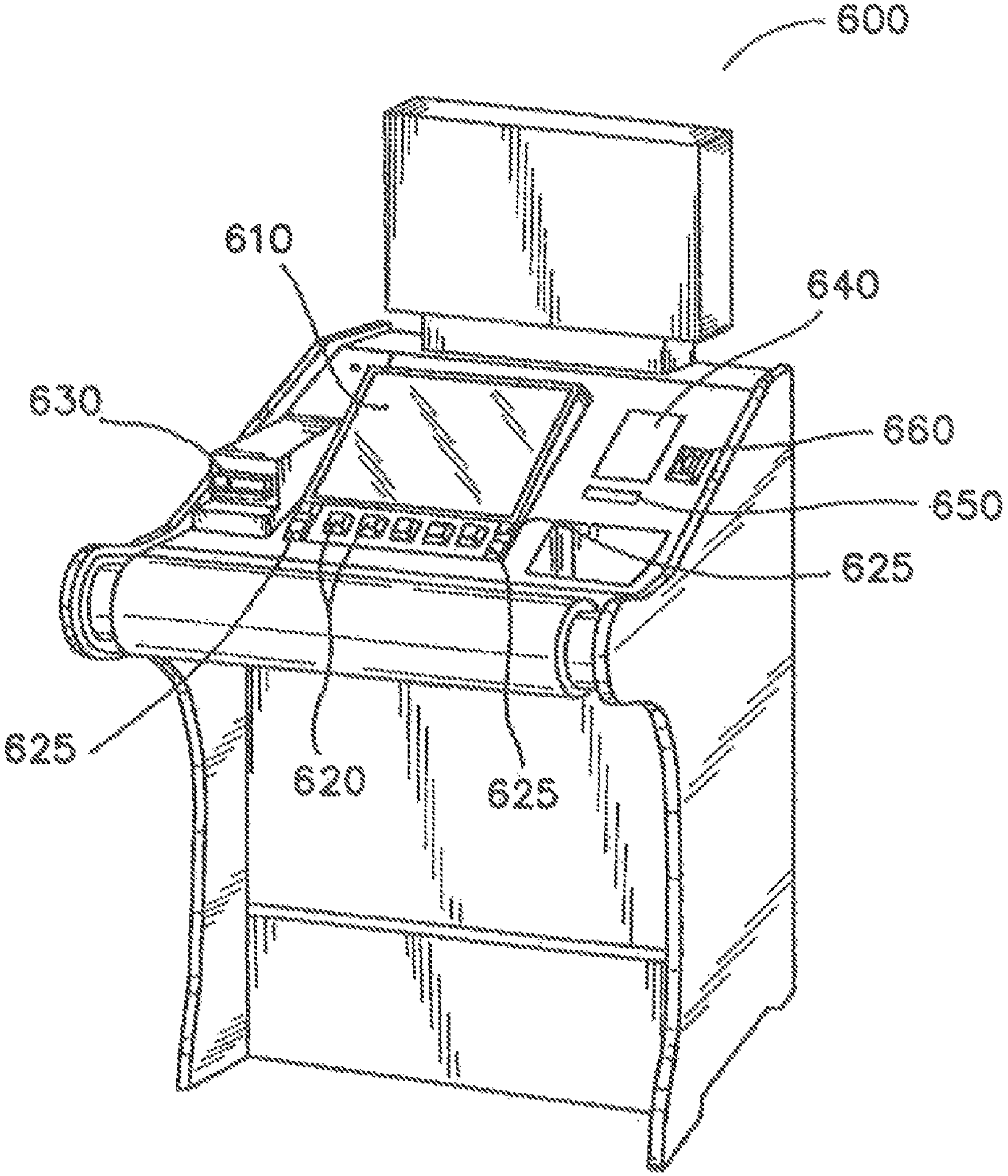
FIG. 5 shows a gaming device of the type which may facilitate an electronic embodiment of the present invention.

FIG. 5 illustrates an electronic gaming device, generally designated as reference numeral 600, of the type that may be used to implement embodiments of the present invention, such as all of the embodiments discussed herein, in an electronic format. The external features of the gaming device 600 include a display 610, wager selection buttons 620, dice selection buttons 625, card reader 630, credit display 640, bill reader 650 and coin input 660. However, the display 610 may also comprise touch screen technology to facilitate simple player interaction. Device switches and similar physical components may also act as player interfaces.

The operation of the gaming device 600 is controlled by a microprocessor that communicates with an internal memory device and the external features of the device 600. The microprocessor also incorporates, or communicates with, a random number generator which ensures the randomness of the rolled dice or specially configured cards during the play of the game. Since the technology for operating and controlling gaming devices is well known to those skilled in the art, the subtle details are not described herein.

Accordingly, in an electronic embodiment of the present invention, a player places or inputs his or her wagers and selects his or her pair of dice. Although this embodiment is discussed with reference to pairs of dice, it should be readily apparent that other elements may be employed such as a die or card decks instead of dice in accordance with this invention. The device processor then selects, according to the non-transitive hierarchy, the proper pair of dice from the two remaining pair of dice and simulates the three dice rolls for both the player and the device. The processor records the results of each roll and resolves the player wagers. Two inherent benefits of the electronic embodiment over a live game are the speed at which the game can be played and the elimination of cheating associated with physical dice.

Other embodiments of the game are clearly possible. For example, three differently-colored electronic modules or "pucks" each having an embedded random number generator and a series of light-emitting diodes (LEDs) or digital displays can replace the three pairs of dice or three decks of cards. In the same manner as the dice or cards, the random number generators are programmed in a non-transitive manner. The player selects his or her electronic unit, followed by the banker/dealer selecting his or her unit. The electronic pucks, or units, are then activated and display their non-transitive outcomes. The outcomes may be akin to dice outcomes such that the display shows conventional dice pips. Alternatively, the electronic units may allow non-integer outcomes (e.g. 4.5) to be displayed. The use of non-integer outcomes allows for very precise manipulation of the probabilities and corresponding payouts.

Also, three differently colored decks of non-transitive cards can be constructed to replace the three dice pairs. Just as the electronic puck embodiment allows more fine-tuning of the non-transitive probabilities, so does this embodiment of the game but to a somewhat lesser extent since the cards must still have integer values. While this more precise "fine tuning" is advantageous, there are some disadvantages with the card decks embodiment. One is that the three decks would have to be composed carefully each shift and checked routinely to verify that no modifications in composition have occurred. (That is, that no cheating has taken place.) Another is that the decks of cards would have to be shuffled after every game. This latter requirement would probably necessitate the use of two automatic shuffling machines so that the game is not slowed down significantly.

While the description above focuses on three rolls per game, the number of rolls may be more or less. Also, the numbers on the non-transitive dice may be modified along with the disclosed payouts.

FIGS. 6-23 provides three embodiments of gaming elements constructed in accordance with the invention in the form of three sets of three pairs of dice, each set of which exhibits a non-transitive relationship among the three pairs. In these three embodiments, each die is substantially cube-shaped having six sides defining six faces with pips or other marks disposed thereon. The faces of each die are shown schematically laid open in the figures primarily for convenience sake to provide a view of all of the faces of each die in one drawing. The dice are referred to by color herein but it should be readily apparent that the dice may be the other colors or the same color, or may include features or other symbols which render the dice as being distinguishable from each other, or be indistinguishable from each other aside from the pips.

Figure 6:
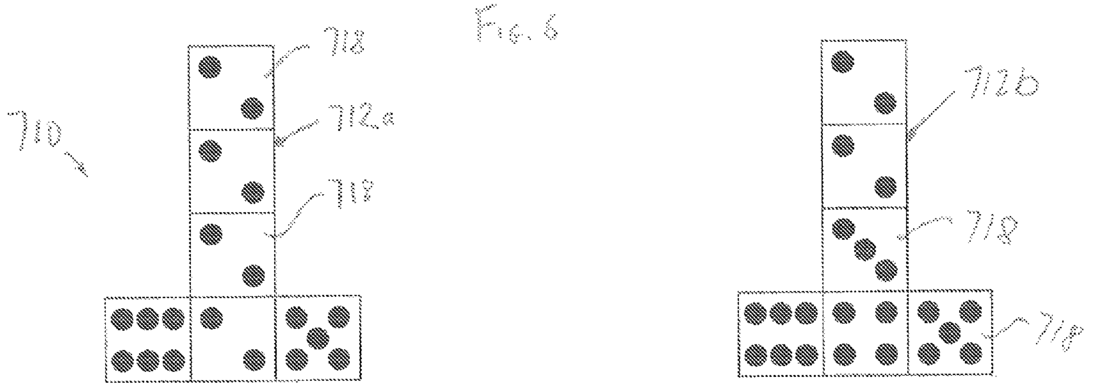
FIG. 6 shows six faces with pips thereon, splayed out, of each die of a first or red pair of dice constructed in accordance with one embodiment of the invention.
Figure 7:
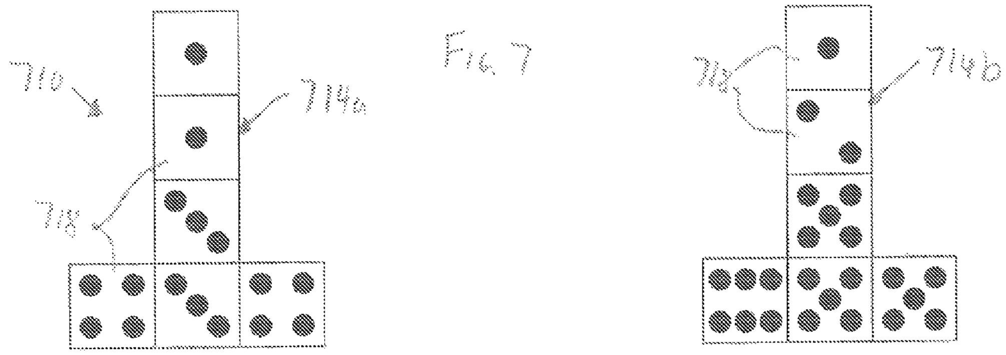
FIG. 7 shows six faces with pips thereon, splayed out, of each die of a second or blue pair of dice constructed in accordance with one embodiment of the invention.
Figure 8:
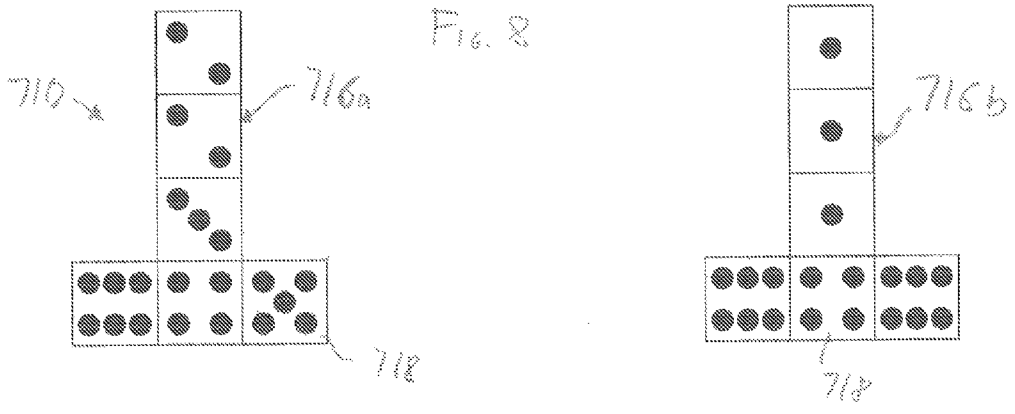
FIG. 8 shows six faces with pips thereon, splayed out, of each die of a third or amber pair of dice constructed in accordance with one embodiment of the invention.

FIGS. 6, 7 and 8 illustrate an embodiment of non-transitive gaming elements 710 which includes a first or red pair of dice, 712*a* and 712*b*, a second or blue pair, 714*a* and 714*b* and a third or amber pair, 716*a* and 716*b*, respectively. Each die includes six faces 718 with one or pips disposes thereon. As shown in FIGS. 6-8, the configuration of pips on faces 718 of each die of this embodiment are as follows:

TABLE

| Pips on Gaming Elements 710 | | | | | | |
|---|---|---|---|---|---|---|
| Red Die 712a | 2 | 2 | 2 | 2 | 5 | 6 |
| Red Die 712b | 2 | 2 | 3 | 4 | 5 | 6 |
| Blue Die 714a | 1 | 1 | 3 | 3 | 4 | 4 |
| Blue Die 714b | 1 | 2 | 5 | 5 | 5 | 6 |
| Amber Die 716a | 2 | 2 | 3 | 4 | 5 | 6 |
| Amber Die 716b | 1 | 1 | 1 | 4 | 6 | 6 |

FIGS. 9-11 provide tables 720, 722 and 724, respectively, which illustrate the relative probabilities of gaming elements 710. Table 720 illustrates all possible roll outcomes for red pair 712 compared with all possible roll outcomes for blue pair 714 to determine the edge or advantage blue pair 714 has over red pair 712. The advantage blue pair 714 has over red pair is the total amount of red wins subtracted from the total amount of blue wins divided by the total of all outcomes, which is "(586−572)/1296" and about 1.0802%. The probability of a tie is the total of red and blue tie outcomes divided by the total of all outcomes, which is "138/1296" and about 10.6481%. Table 722 illustrates all possible roll outcomes for amber pair 716 compared with all possible roll outcomes for red pair 712 to determine the edge red pair 712 has over amber pair 716, in the manner as described above, to be about 1.1574% and probability of a tie to be about 10.2623%. Table 724 illustrates all possible roll outcomes for amber pair 716 compared with all possible roll outcomes for blue pair 714 to determine the edge amber pair 716 has over blue pair 712 to be about 0.9259% and probability of a tie to be about 10.6481%. It is noted that the total amount of pips on each of the three pairs are not equal, in that red pair 712 has 41 pips, blue pair 714 has 40 pips and amber pair 716 has 41 pips. The mean advantage between all gaming elements 710 is therefore 1.055%, and the deviation from the mean of any pair 712, 714 or 716, is well less than 0.5% in this embodiment. The mean of the probabilities of any two elements resulting in a tie score is 10.520%. The deviation from that mean for any pair is less than 1% in this embodiment.

Figure 12:
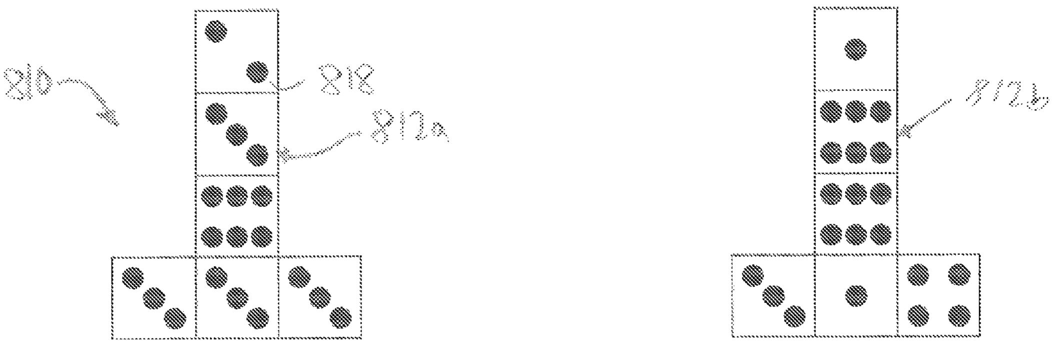
FIG. 12 shows six faces with pips thereon, splayed out, of each die of a first or red pair of dice constructed in accordance with another embodiment of the invention.
Figure 13:
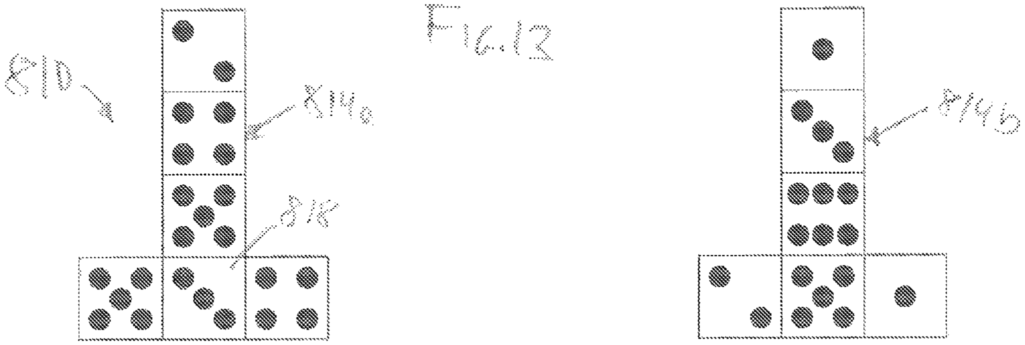
FIG. 13 shows six faces with pips thereon, splayed out, of each die of a second or blue pair of dice constructed in accordance with another embodiment of the invention.
Figure 14:
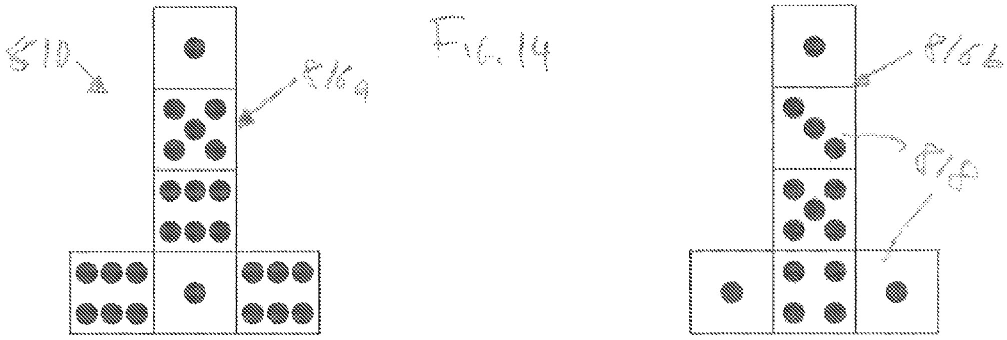
FIG. 14 shows six faces with pips thereon, splayed out, of each die of a third or amber pair of dice constructed in accordance with another embodiment of the invention.

FIGS. 12, 13 and 14 illustrate another embodiment of non-transitive gaming elements 810 which include a first or red pair of dice, 812*a* and 812*b*, a second or blue pair, 814*a* and 814*b* and a third or amber pair, 816*a* and 816*b*, respectively. Each die includes six faces 818 with one or pips disposes thereon. As shown in FIGS. 12-14, the configuration of pips on faces 818 of each die of this embodiment are as follows:

TABLE

| Pips on Gaming Elements 810 | | | | | | |
|---|---|---|---|---|---|---|
| Red Die 812a | 2 | 3 | 3 | 3 | 3 | 6 |
| Red Die 812b | 1 | 1 | 3 | 4 | 6 | 6 |
| Blue Die 814a | 2 | 3 | 4 | 4 | 5 | 5 |
| Blue Die 814b | 1 | 1 | 2 | 3 | 5 | 6 |
| Amber Die 816a | 1 | 1 | 5 | 6 | 6 | 6 |
| Amber Die 816b | 1 | 1 | 1 | 3 | 4 | 5 |

FIGS. 15-17 provide tables 820, 822 and 824, respectively, which illustrate the relative probabilities of gaming elements 810. Table 820 illustrates all possible roll outcomes for red pair 812 compared with all possible roll outcomes for blue pair 814 to determine the edge or advantage blue pair 814 has over red pair 812 to be about 0.6173% and probability of a tie to be about 10.6481%. Table 822 illustrates all possible roll outcomes for amber pair 816 compared with all possible roll outcomes for red pair 812 to determine the edge red pair 812 has over amber pair 816 to be about 0.5401% and probability of a tie to be about 10.7253%. Table 824 illustrates all possible roll outcomes for amber pair 816 compared with all possible roll outcomes for blue pair 814 to determine the edge amber pair 816 has over blue pair 812 to be about 0.6173% and probability of a tie to be about 10.4938%. It is noted that the total amount of pips on each of the three pairs are not equal, in that red pair 812 has 41 pips, blue pair 814 has 41 pips and amber pair 816 has 40 pips.

The mean advantage between all gaming elements 810 is therefore 0.5916%, and the deviation from the mean of any pair 812, 814 or 816, is less than the prior embodiment. The mean of the probabilities of any two elements resulting in a tie score is 10.6224%.

Figure 18:
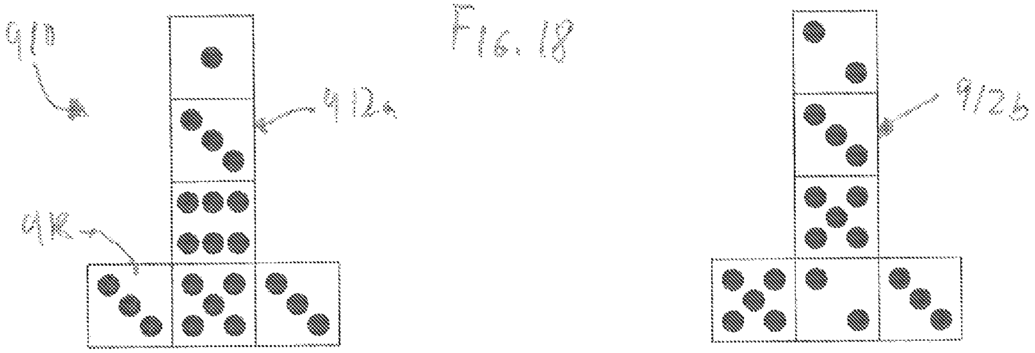
FIG. 18 shows six faces with pips thereon, splayed out, of each die of a first or red pair of dice constructed in accordance with yet another embodiment of the invention.
Figure 19:
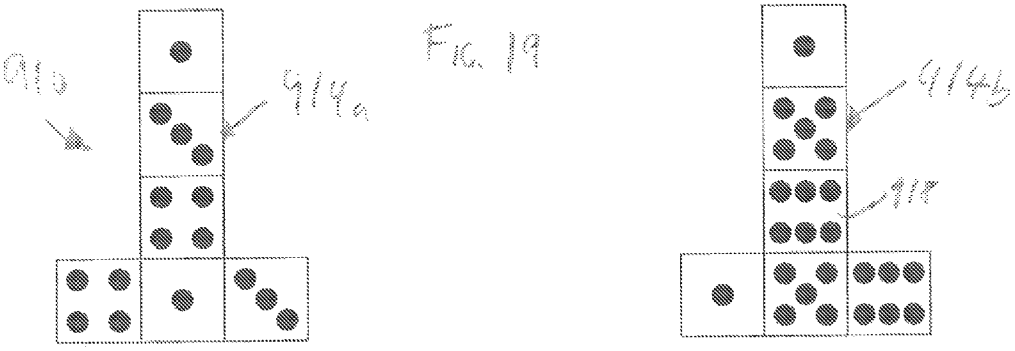
FIG. 19 shows six faces with pips thereon, splayed out, of each die of a second or blue pair of dice constructed in accordance with yet another embodiment of the invention.
Figure 20:
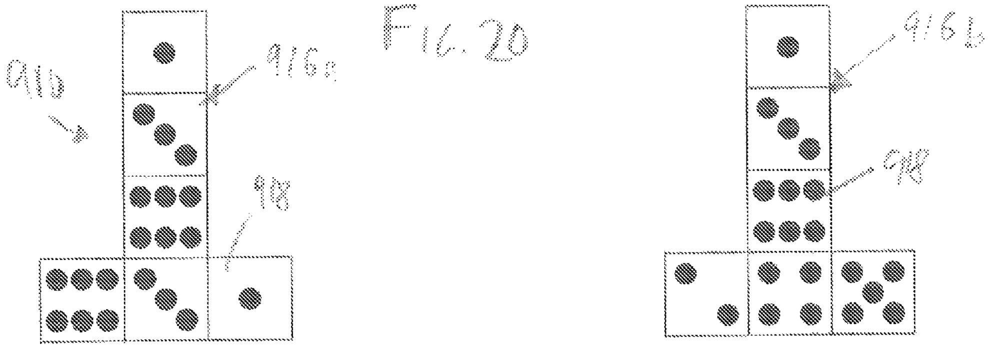
FIG. 20 shows six faces with pips thereon, splayed out, of each die of a third or amber pair of dice constructed in accordance with yet another embodiment of the invention.

FIGS. 18, 19 and 20 illustrate yet another embodiment of non-transitive gaming elements 910 which include a first or red pair of dice, 912*a* and 912*b*, a second or blue pair, 914*a* and 914*b* and a third or amber pair, 916*a* and 916*b*, respectively. Each die includes six faces 918 with one or pips disposes thereon. As shown in FIGS. 18-20, the configuration of pips on faces 918 of each die of this embodiment are as follows:

TABLE

| Pips on Gaming Elements 910 | | | | | | |
|---|---|---|---|---|---|---|
| Red Die 912a | 1 | 3 | 3 | 3 | 5 | 6 |
| Red Die 912b | 2 | 2 | 3 | 3 | 5 | 5 |
| Blue Die 914a | 1 | 1 | 3 | 3 | 4 | 4 |
| Blue Die 914b | 1 | 1 | 5 | 5 | 6 | 6 |
| Amber Die 916a | 1 | 1 | 3 | 3 | 6 | 6 |
| Amber Die 916b | 1 | 2 | 3 | 4 | 5 | 6 |

FIGS. 21-23 provide tables 920, 922 and 924, respectively, which illustrate the relative probabilities of gaming elements 910. Table 920 illustrates all possible roll outcomes for red pair 912 compared with all possible roll outcomes for blue pair 914 to determine the edge or advantage blue pair 914 has over red pair 912 to be "(584−576)/1296" which is about 0.6173% and probability of a tie to be "136/1296" which is about 10.4938%. Table 922 illustrates all possible roll outcomes for amber pair 916 compared with all possible roll outcomes for red pair 912 to determine the edge red pair 912 has over amber pair 916 to be about 0.6173% and probability of a tie to be about 10.4938%. Table 924 illustrates all possible roll outcomes for amber pair 916 compared with all possible roll outcomes for blue pair 914 to determine the edge amber pair 916 has over blue pair 912 to be about 0.6173% and probability of a tie to be about 10.4938%. It is noted that the total amount of pips on each of the three pairs are not equal, in that red pair 912 has 41 pips, blue pair 914 has 40 pips and amber pair 916 has 41 pips. It is further noted that in this embodiment, the advantages and tie probabilities among the three pairs of gaming elements in this embodiment are identical (that is, "(584−576)/1296" and "136/1296").

FIGS. 24-26 illustrate another embodiment of non-transitive gaming elements 1010 comprising three decks of non-transitive cards, a red deck 1012, blue deck 1014 and amber deck 1016. In this embodiment, each deck includes 36 cards and each of the cards is assigned numerical values of one to eleven. It should be understood that a special deck or a conventional playing cards may be used in which additional cards of certain values may be added and non-numbered cards may be reassigned new values, such as for example, a configuration in which Aces have a value of one and face cards (Jacks, Queens, or Kings) have a value of eleven, or red Aces have a value of one and black aces have a value of eleven. Other variations may be employed with this embodiment so long as the number of cards of each value in each deck correspond to the number of cards of each value in each deck as set forth in the below table.

TABLE

| Gaming Elements 1010 | | | | | | | | | | | |
|---|---|---|---|---|---|---|---|---|---|---|---|
| Card Value | 1 | 2 | 3 | 4 | 5 | 6 | 7 | 8 | 9 | 10 | 11 |
| Deck | Number of cards in each deck having the above value: | | | | | | | | | | |
| Red Deck 1012 | None | 2 | 2 | 6 | 8 | 2 | 10 | 2 | 2 | 2 | None |
| Blue Deck 1014 | 4 | None | 4 | 4 | 4 | 4 | 4 | 8 | 4 | None | None |
| Amber Deck 1016 | 2 | 2 | 4 | 4 | 4 | 6 | 4 | 4 | 2 | 2 | 2 |

FIGS. 24-26 shows the complete probability analysis for all possible single-card deals for all three possible non-transitive deck pairings, namely, red deck 1012 vs. blue deck 1014, blue deck 1014 vs. amber deck 1016, and amber deck 1016 vs. red deck 1012. All three possible deck pairings exhibit identical edges of 8/1296 or about 0.62%, presuming cards are selected at random or dealt from a randomly-ordered deck. Also, each of the three possible deck pairings has exactly the same tie probability, namely, 136/1296 or about 10.49%, again presuming that the cards are selected at random or dealt from a randomly-ordered deck.

It will be appreciated by those skilled in the art that while the disclosure has been described above in connection with particular embodiments and examples, the scope of the invention is not necessarily so limited, and that numerous other embodiments, examples, uses, modifications and departures from the embodiments, examples and uses described herein are intended to be encompassed by the invention, claims attached hereto and equivalents thereof.

What is claimed is:

1. Non-transitive gaming elements, comprising:

a) a first one or more gaming elements configured for providing a first random outcome associated with a score;

b) a second one or more gaming elements configured for providing a second random outcome associated with a score; and c) a third one or more gaming elements configured for providing a third random outcome associated with a score, wherein:

the second one or more gaming elements provides an advantage represented by higher scores, on average, as compared with the scores of the first one or more gaming elements, the third one or more gaming elements provides an advantage represented by higher scores, on average, as compared with the scores of the second one or more gaming elements and the first one or more gaming elements provides an advantage represented by higher scores, on average, as compared with the scores of the third one or more gaming elements, and wherein each advantage of the three respective advantages associated with the aforementioned respective one or more first, second or third gaming elements is at least greater than 0 percent and each advantage of the three respective advantages does not differ from the mean of the three respective advantages by more than 20 percent.

2. Non-transitive gaming elements as recited in claim 1, wherein the outcomes of the first, second and third gaming elements are each associated with a numerical value.

3. Non-transitive gaming elements as recited in claim 2, wherein a higher numerical value is equivalent to a higher score.

4. Non-transitive gaming elements as recited in claim 1, wherein the first, second and third gaming elements are configured to provide three respective probabilities of achieving a tie score wherein the three tie probabilities are all greater than 10 percent and less than 12 percent and are substantially the same among the first, second and third gaming elements wherein each tie probability does not differ from the mean of the three tie probabilities by more than 5 percent.

5. Non-transitive gaming elements as recited in claim 1, wherein the gaming elements are dice.

6. Non-transitive gaming elements as recited in claim 5, wherein the first, second and third random outcomes are each associated with an integer.

7. Non-transitive gaming elements as recited in claim 1, wherein the three respective advantages do not differ from their mean by more than 1 percent.

8. Non-transitive gaming elements as recited in claim 1, wherein the first, second and third gaming elements are groups of specially configured non-transitive cards.

9. Non-transitive gaming elements as recited in claim 8, wherein the first non-transitive group of cards comprises 36 cards of the following configuration: two 2s, two 3s, six 4s, eight 5s, two 6s, ten 7s, two 8s, two 9s and two 10s; the second group of cards comprises 36 cards of the following configuration: four 1s, four 3s, four 4s, four 5s, four 6s, four 7s, eight 8s and four 9s; and the third group of cards comprises 36 cards of the following configuration: two 1s, two 2s, four 3s, four 4s, four 5s, six 6s, four 7s, four 8s, two 9s, two 10s and two 11s.

10. Non-transitive gaming elements as recited in claim 1, wherein the first, second and third one or more gaming elements include features which render each of the first, second and third one or more gaming elements distinguishable from one another.

11. Non-transitive gaming elements, comprising:

a) a first one or more dice configured for generating a first random roll outcome associated with a score;

b) a second one or more dice configured for generating a second random roll outcome associated with a score; and c) a third one or more dice configured for generating a third random roll outcome associated with a score, wherein:

the second one or more dice differs from the first one or more dice in that the second one or more dice is further configured to provide a higher roll score at a statistical advantage of x as compared with the roll score of the first one or more dice, the third one or more dice differs from the second one or more dice in that the third one or more dice is further configured to provide a higher roll score at a statistical advantage of y as compared with the roll score of the second one or more dice and the first one or more dice differs from the third one or more dice in that the first one or more dice is further configured to provide a higher roll score at a statistical advantage of z as compared with the roll score of the third one or more dice, wherein x, y and z each represent respective values that are greater than zero percent and less than 5 percent.

12. Non-transitive gaming elements as recited in claim 11, wherein the first one or more dice are a first color, the second one or more dice are a second color and third one or more dice are a third color, the first, second and third colors being different from one another.

13. Non-transitive gaming elements as recited in claim 11, wherein the first, second and third one or more dice each comprise dice having six sides.

14. Non-transitive gaming elements as recited in claim 13, wherein the first one or more dice further comprises a first die with 1, 3, 3, 3, 5 and 6 pips, respectively on each side, and a second die with 2, 2, 3, 3, 5 and 5 pips, respectively on each side.

15. Non-transitive gaming elements as recited in claim 13, wherein the second one or more dice further comprises a first die with 1, 1, 3, 3, 4 and 4 pips, respectively on each side, and a second die with 1, 1, 5, 5, 6 and 6 pips, respectively on each side.

16. Non-transitive gaming elements as recited in claim 13, wherein the third one or more dice further comprises a first die with 1, 1, 3, 3, 6 and 6 pips, respectively on each side, and a second die with 1, 2, 3, 4, 5 and 6 pips, respectively on each side.

17. Non-transitive gaming elements as recited in claim 11, wherein each of the three respective probabilities of achieving a tie score among the first, second and third one or more dice does not differ from the mean of said three probabilities by more than 2 percent.

18. Non-transitive gaming elements as recited in claim 11, wherein x, y and z are each the same value.

19. Gaming apparatus for producing non-transitive random outcomes, comprising:

a) a first one or more gaming elements configured for providing a first randomly generated score;

b) a second one or more gaming elements configured for providing a second randomly generated score; and c) a third one or more gaming elements configured for providing a third randomly generated score, wherein the first, second and third gaming elements are configured for:

the second randomly generated score to be a higher score, on average, than the first randomly generated score by an advantage associated with a value in the range between greater than zero percent and less than 5 percent, and the third randomly generated score to be a higher score, on average, than the second randomly generated score by an advantage associated with a value in the range between greater than zero percent and less than 5 percent, the first randomly generated score to be a higher score, on average, than the third randomly generated score by an advantage associated with a value in the range between greater than zero percent and less than 5 percent, with each of the three pairings of the first, second or third randomly generated scores having a respective probability associated with a value in the range of greater than 5 percent and less than 15 percent of being a tie.

20. Gaming apparatus as recited in claim 19, wherein the first, second and third gaming elements are configured for the second randomly generated score to be a higher score, on average, than the first randomly generated score by an advantage A, the third score to be a higher score, on average, than the second randomly generated score by the advantage A, and the first randomly generated score to be a higher score, on average, than the third randomly generated score by the advantage A, wherein A is a value greater than zero percent and less than 5 percent.

21. Gaming apparatus as recited in claim 19, wherein the first, second and third gaming elements are configured to provide the same probability of any pairing of the first, second and third randomly generated scores being a tie.

22. Gaming apparatus as recited in claim 19, wherein the first, second and third randomly generated scores are randomly generated numerical values.

23. Gaming apparatus as recited in claim 22, wherein a higher score corresponds with a higher randomly generated numerical value.

24. Gaming apparatus as recited in claim 22, wherein a tie corresponds with any two of the first, second or third randomly generated scores achieving the same numerical value.

25. Gaming apparatus as recited in claim 19, wherein each of the first, second and third gaming elements comprise a pair of six-sided dice.

26. Gaming apparatus as recited in claim 19, wherein the first, second and third gaming elements further comprise one or more data processors.

27. Gaming apparatus as recited in claim 19, further comprising a display for displaying the first, second and third randomly generated scores.

* * * * *